US010107891B1

(12) United States Patent
Ngo et al.

(10) Patent No.: US 10,107,891 B1
(45) Date of Patent: Oct. 23, 2018

(54) WIRELESS SIGNAL LOCALIZATION AND COLLECTION FROM AN AIRBORNE SYMMETRIC LINE ARRAY NETWORK

(71) Applicant: The United States of America, as represented by the Secretary of the Navy, Washington, DC (US)

(72) Inventors: Tan Anh Ngo, Auburn, VA (US); Murali Tummala, Monterey, CA (US); John C. McEachen, Carmel, CA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 497 days.

(21) Appl. No.: 14/883,384

(22) Filed: Oct. 14, 2015

Related U.S. Application Data

(60) Provisional application No. 62/064,354, filed on Oct. 15, 2014.

(51) Int. Cl.
*G01S 5/02* (2010.01)
*G01S 3/02* (2006.01)
(Continued)

(52) U.S. Cl.
CPC .......... *G01S 5/0289* (2013.01); *G01S 5/0221* (2013.01); *G01S 5/0278* (2013.01); *G01S 5/06* (2013.01); *H04W 84/18* (2013.01)

(58) Field of Classification Search
CPC .............................. G01S 5/0221; G01S 5/0289
(Continued)

(56) References Cited

U.S. PATENT DOCUMENTS

2004/0017312 A1* 1/2004 Anderson ................ G01S 5/02
342/457

OTHER PUBLICATIONS

Ngo, Tan A., "Wireless Source Localization and Signal Collection From an Airborne Symmetric Line Array Sensor Network," Naval Postgraduate School, Thesis, Sep. 2014, pp. 1-129.
(Continued)

*Primary Examiner* — Dao L Phan
(74) *Attorney, Agent, or Firm* — Naval Postgraduate School; Lisa A. Norris

(57) ABSTRACT

A method and system of determining a location of a remote transmitter is provided. The method includes: receiving, with a plurality of sensors operably associated with a plurality of unmanned aerial vehicles (UAVs), a signal emitted from a remote transmitter, the emitted signal being indicative of an actual location of the remote transmitter; estimating a first location of the remote transmitter based on the emitted signal received by the plurality of sensors, the plurality of sensors being associated with a first arrangement of the corresponding plurality of UAVs relative to the remote transmitter; changing the first arrangement of the plurality of UAVs relative to the remote transmitter to a target arrangement of the plurality of UAVs relative to the remote transmitter based on the estimation of the first location of the remote transmitter; and estimating a second location of the remote transmitter based on the target arrangement of the plurality of sensors and the corresponding plurality of UAVs relative to the remote transmitter. The second estimated location is more accurate of the actual location of the remote transmitter than the first estimated location.

19 Claims, 15 Drawing Sheets
(9 of 15 Drawing Sheet(s) Filed in Color)

(51) Int. Cl.
*G01S 5/06* (2006.01)
*H04W 84/18* (2009.01)

(58) Field of Classification Search
USPC ............... 342/419, 442, 444, 457, 463–465;
701/408, 491; 455/456.6
See application file for complete search history.

(56) References Cited

OTHER PUBLICATIONS

T. A. Ngo, M. Tummala and J. C. McEachen, "Optimal Wireless Aerial Sensor Node Positioning for Randomly Deployed Planar Collaborative Beamforming," 2014 47th Hawaii International Conference on System Sciences, Waikoloa, HI, 2014, pp. 5122-5128, doi: 10.1109/HICSS.2014.630.

* cited by examiner

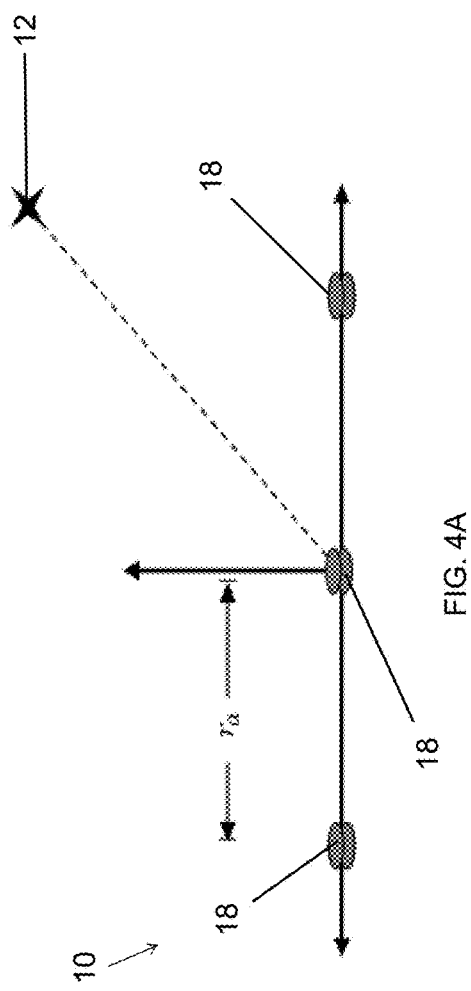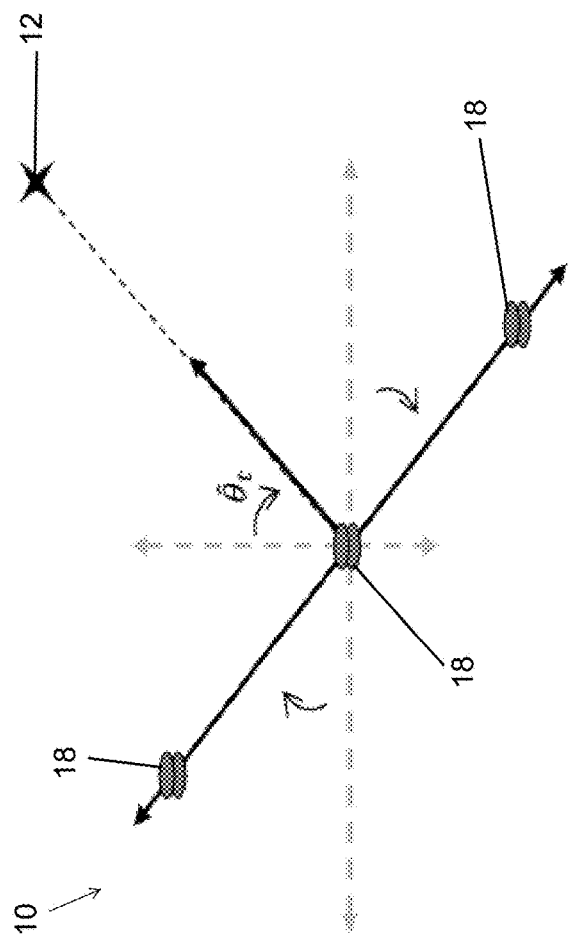
FIG. 4A
FIG. 4B

WIRELESS SIGNAL LOCALIZATION AND COLLECTION FROM AN AIRBORNE SYMMETRIC LINE ARRAY NETWORK

CROSS REFERENCE TO RELATED PATENTS AND APPLICATIONS

The application claims priority benefit of U.S. Provisional Application No. 62/064,354, filed Oct. 15, 2014, which is incorporated herein by reference in its entirety.

BACKGROUND

Wireless communication technology has become a critical aspect in many civilian and military applications. With regard to remote sensing, search and rescue, and disaster relief operations, there exists an interest in developing capabilities to collect these signals-of-interest.

With the increased use of unmanned aerial vehicles (UAVs) in military and civilian applications, researchers and major companies are beginning to push for their adoption into wireless sensor networks (WSNs). Recently, large-scale, high altitude wireless networks have been proposed to provide internet access to undeveloped regions. One notable project hopes to deliver internet access via a wireless network of UAVs. This network consists of large scale UAVs deployed at an altitude of 20 km (see References 1 and 2). Another concept uses a single high altitude UAV in conjunction with a concentric circle WSN formation to enhance network to sink connectivity (see Reference 3). Operating at a smaller scale and altitude, multirotor UAVs can also deliver similar capabilities at a much lower price point (see Reference 4).

Beamforming has been shown to be an effective method for signal collection and interference rejection (see Reference 5), but it has been shown to be highly susceptible to array steering vector errors (see Reference 6). This is when an array steering vector is not in line with that of the target signal. To make beamforming more robust against these array mismatch errors, Ahmed and Evans (see Reference 7) suggest the use of inequality constraints on the array weights. Lee and Lee (see Reference 8) proposed a robust beamformer for signal collection, which minimizes a cost function based on received signal data and knowledge of steering error statistics.

INCORPORATION BY REFERENCE

[Reference 1] Facebook Inc., "Connecting the World from the Sky," Facebook Inc., March 2014. [Online] available: http://www.internet.org/press/connecting-the-world-from-the-sky;

[Reference 2] Titan Aerospace Inc., "Solara 50 Atmospheric Satellite," Titan Aerospace Inc., 2013. [Online] available: http://titanaerospace.com/;

[Reference 3] Y. Albagory and O. Said, "Optimizing concentric circular antenna arrays for high-altitude platforms wireless sensor networks," Int. J. Comput. Network and Inform. Security, vol. 5, pp. 1-8, 2014;

[Reference 4] H. Lim, J. Park, D. Lee and H. J. Kim, "Build Your Own Quadrotor: Open-Source Projects on Unmanned Aerial Vehicles," IEEE Robot. Automat. Mag., vol. 19, no. 3, pp. 33-45, September 2012;

[Reference 5] B. D. V. Veen and K. M. Buckley, "Beamforming: a versatile approach to spatial filtering," IEEE ASSP Mag, vol. 5, no. 2, pp. 4-24, April 1986;

[Reference 6] J. H. Lee and C. C. Wang, "Adaptive array beamforming with robust capabilities under random sensor position errors," Radar, Sonar and Navigation, IEE Proc., vol. 152, no. 6, pp. 383-390, December 2005;

[Reference 7] K. M. Ahmed and R. J. Evans, "Robust signal and array processing," IEE Proc. F, Commun. Radar Signal Process., vol. 129, no. 4, pp. 297-302, August 1981;

[Reference 8] C. Lee and J. Lee, "Robust adaptive array beamforming under steering vector errors," IEEE Trans. Antennas Propag., vol. 45, no. 1, pp. 168-175, January 1997;

[Reference 9] G. C. Carter, "Variance Bounds for Passively Locating an Acoustic Source with a Symmetric Line Array," J. Acoust. Soc. Am., vol. 62, pp. 922-926, October 1977;

[Reference 10] K. C. Ho and L. M. Vicente, "Sensor Allocation for Source Localization With Decoupled Range and Bearing Estimation," IEEE Trans. Signal Process., vol. 56, no. 12, pp. 5773-5789, December 2008;

[Reference 11] R. Mahony, V. Kumar and P. Corke, "Multirotor Aerial Vehicles: Modeling, Estimation, and Control of Quadrotor," IEEE Robot. Automat. Mag., vol. 19, no. 3, pp. 20-32, 2012;

[Reference 12] S. R. B. d. Santos, S. N. Givigi and C. L. Nascimento, "Autonomous construction of structures in a dynamic environment using Reinforcement Learning," in proc. SysCon, Orlando, Fla., April 2013;

[Reference 13] Y. Wang, M. Wilkerson and X. Yu, "Hybrid sensor deployment for surveillance and target detection in wireless sensor networks," in proc. IWCMC, Istanbul, Turkey, 2011;

[reference 14] E. Yanmaz, R. Kuschnig and C. Bettstetter, "Channel measurements over 802.11a-based UAV-to-ground links," in proc. GC Wkshps, Houston, Tex., December 2011;

[Reference 15] S. L. Waslander and C. Wang, "Wind Disturbance Estimation and Rejection for quadrotor position control," in proc. AIAA Infotech Aerospace Conf., Seattle, Wash., April 2009;

[Reference 16] R. Mahony, V. Kumar and P. Corke, "Multirotor Aerial Vehicles: Modeling, Estimation, and Control of Quadrotor," IEEE Robot. Automat. Mag., vol. 19, no. 3, pp. 20-32, September 2012;

[Reference 17] D. J. Torrieri, "Statistical Theory of Passive Location Systems," IEEE Trans. Aerosp. Electron. Syst., vol. 20, no. 2, pp. 183-198, March 1984;

[Reference 18] M. L. Boas, Mathematical Methods in the Physical Sciences, N.J.: Wiley, John & Sons Inc., 2006;

[Reference 19] J. Abel and J. O. Smith, "Source range and depth estimation from multipath range difference measurements," IEEE Trans. Acoust., Speech, Signal Process., vol. 37, no. 8, pp. 1157-1165, August 1989;

[Reference 20] Y. T. Chan and K. C. Ho, "A simple and efficient estimator for hyperbolic location," IEEE Trans. Signal Process., vol. 42, no. 8, pp. 1905-1915, August 1994;

[Reference 21] H. Cramer, Mathematical Methods of Statistics, Princeton, N.J.: Princeton Univ. Press., 1946;

[Reference 22] J. M. Mendel, Lessons in Digital Estimation Theory, Englewood Cliffs, N.J.: Prentice-Hall, 1987;

[Reference 23] J. Litva and T. K. Lo, Digital Beamforming in Wireless Communications, MA: Artech House inc., 1996;

[Reference 24] H. Ochiai, P. Mitran, H. V. Poor and V. Tarokh, "Collaborative beamforming for distributed wireless ad hoc sensor networks," IEEE Trans. Signal Process., vol. 53, no. 11, pp. 4110-4124, November 2005;

[Reference 25] R. Mudumbai, G. Barriac and U. Madhow, "On the Feasibility of Distributed Beamforming in Wireless Networks," IEEE Trans. Wireless Commun., vol. 6, no. 5, pp. 1754-1763, May 2007;

[Reference 26] R. J. Mailloux, Phased Array Antenna Handbook, Boston, Mass.: Artech House, 1994;

[Reference 27] K. V. Mardia, Statistics of Directional Data, New York: Academic Press Inc., 1972;

[Reference 28] T. T. Ha, Theory and Design of Digital Communication Systems, Cambridge, UK: Cambridge University Press, 2011;

[Reference 29] C. W. Therrien and M. Tummala, Probability and random process for electrical and computer engineers, Boca Raton, Fla.: CRC Press, 2012;

[Reference 30] K. Lange, Applied Probability, New York: Springer Science+Business Media LLC, 2010;

[Reference 31] A. Caron, "Surface impact location system," in Proc. Ocean, Newport, R.I., September 1972;

[Reference 32] A. Bjorck, *Numerical Methods for Least-squares Problems*, Philadelphia: SIAM, 1996; and

[Reference 33] B. Feng and D. C. Jenn, "Grating lobe suppression for distributed digital subarrays using virtual filling," IEEE Antennas Wireless Propag. Lett., vol. 12, pp. 1323-1326, October 2013 are incorporated herein by reference in their entirety.

BRIEF DESCRIPTION

In one embodiment of this disclosure, described is A computer-implemented method of determining a location of a remote transmitter is provided. The method includes: receiving, with a plurality of sensors operably associated with a plurality of unmanned aerial vehicles (UAVs), a signal emitted from a remote transmitter, the emitted signal being indicative of an actual location of the remote transmitter; estimating a first location of the remote transmitter based on the emitted signal received by the plurality of sensors, the plurality of sensors being associated with a first arrangement of the corresponding plurality of UAVs relative to the remote transmitter; changing the first arrangement of the plurality of UAVs relative to the remote transmitter to a target arrangement of the plurality of UAVs relative to the remote transmitter based on the estimation of the first location of the remote transmitter; and estimating a second location of the remote transmitter based on the target arrangement of the plurality of sensors and the corresponding plurality of UAVs relative to the remote transmitter. The second estimated location is more accurate of the actual location of the remote transmitter than the first estimated location.

In another embodiment of this disclosure, described is a system for determining a location of a remote transmitter. The system includes a plurality of unmanned aerial vehicles (UAVs). A plurality of sensors is operably associated the UAVs. Each of the sensors is configured to receive an emitted signal from an associated remote transmitter. The emitted signal is indicative of an actual location of the associated remote transmitter. Each of the sensors includes at least one processor programmed to: estimate a first location of the associated remote transmitter based on the received signal; change an arrangement of the plurality of UAVs relative to the associated remote transmitter based on the estimation of the first location of the associated remote transmitter; and calculate a second location of the associated remote transmitter based on the arrangement of the UAVs relative to the associated remote transmitter. The second location being more accurate of the actual location of the associated remote transmitter than the first location.

In still another embodiment of this disclosure, described is a system for determining a location of a remote transmitter. The system includes a remote transmitter configured to emit a signal indicative of an actual location thereof. Three groups of unmanned aerial vehicles (UAVs) are arranged relative to the remote transmitter. A plurality of sensors is operably associated with each UAV. Each of the sensors includes at least one processor programmed to: receive the emitted signal from the remote transmitter; estimate a first location of the remote transmitter based on the received signal by: obtaining a location estimate associated with the emitted signal; and calculate an angle of an emitter bearing estimate based on the location estimate; change an arrangement of the UAVs relative to the remote transmitter based on the angle of the emitter bearing estimate such that the UAVs are arranged to be substantially perpendicular to the remote transmitter; and calculate a second location of the remote transmitter based on the arrangement of the UAVs relative to the remote transmitter. The second location is more accurate of the actual location of the remote transmitter than the first location.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A and 4B show a first arrangement and a target arrangement, respectively, of the sensor nodes of FIG. 2;

DETAILED DESCRIPTION

The present disclosure relates generally to determining a location of a remote transmitter. To accomplish this, a signal collection scheme exploits an elevated, mobile network to maximize the collaborative collection of a target signal. Such a network can be realized, for example, with multi-rotor unmanned aerial vehicles (UAVs) acting as sensor nodes in a wireless sensor network.

As described in more detail below, the proposed scheme begins in the localization phase once a signal has been detected. A set of time difference of arrival measurements are generated, which is fed to a location estimator. Using this initial location estimate, the sensor network is reorient to be substantially perpendicular to the target emitter to maximize the accuracy of the location estimate (e.g., a refined estimate). Using the refined estimate to obtain an improved location estimate, this information is used in the signal collection phase. In this signal collection phase, each node in the network samples the signal and transmits these samples to the network's sink node. Located in the center of the network, the sink node uses a combination of beamform processing and signal estimation to combine and amplify the signal samples coherently. This makes the signal collection phase essentially a collaborative beamforming effort.

Figure 1:
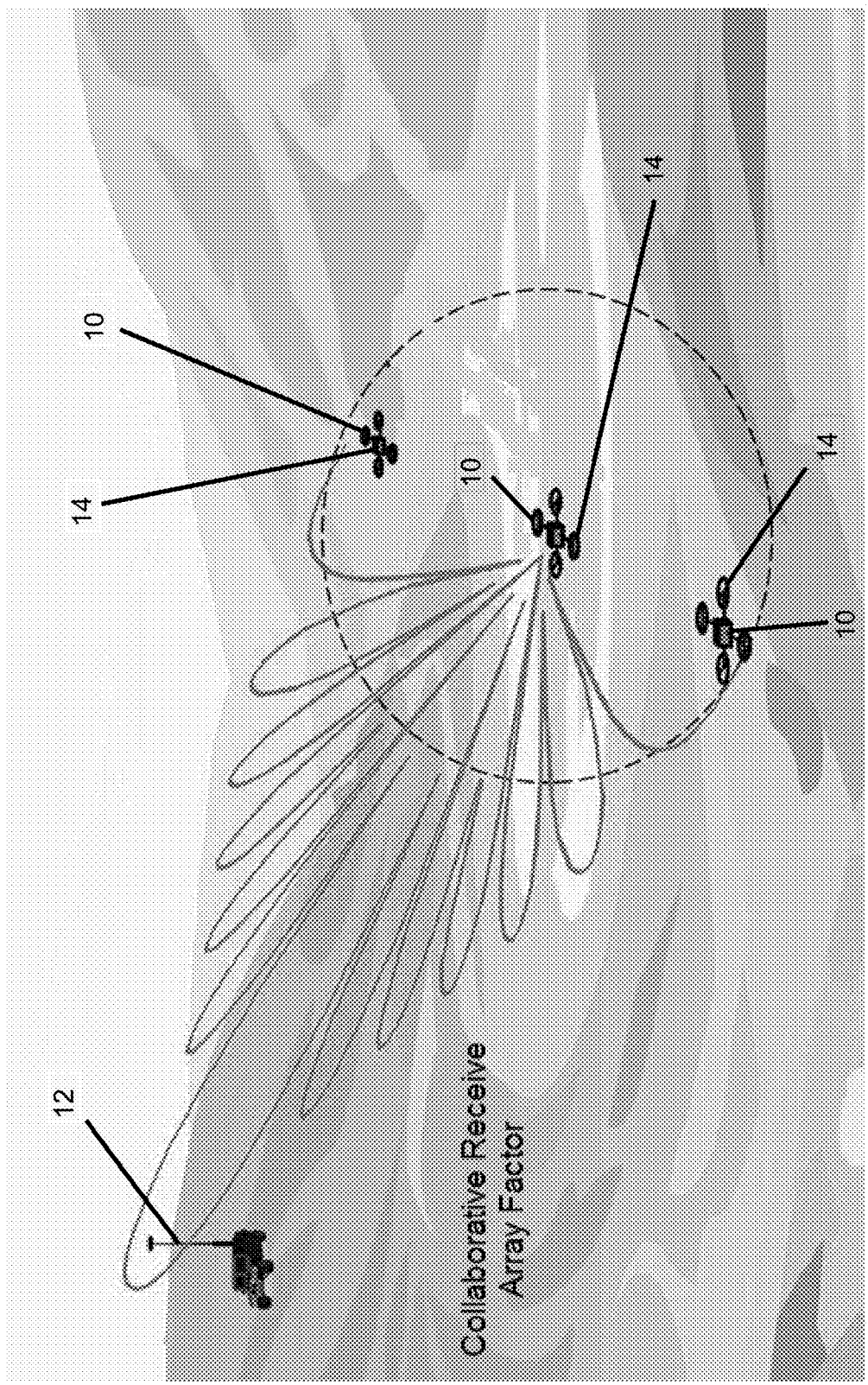
FIG. 1 shows an environment of a potential use of a system in accordance with one aspect of the present disclosure.

FIG. 1 shows a proposed operational scheme for the present disclosure. As shown in FIG. 1, a plurality of multi-rotor UAVs 10 is positioned in an area relative to a remote transmitter 12. The transmitter 12 can be a distant, stationary, sporadic or repeating source emitter located at a first location from the UAVs 10. Each of the UAVs 10 includes a plurality of sensors 14 operably associated therewith. The UAVs 10, with the sensors 14 operably associated therewith, are deployed with the goal of locating the remote transmitter 12 and collecting its signals. In some embodiments, the sensors 14 are configured to receive one or more signals from a remote transmitter 12 that is programmed to specifically communicate with only the sensors. In other embodiments, the sensors 14 are configured to receive one or more signals from any remote transmitter 12 (e.g., a transmitter worn by a fireman, a hiker, a first-responder, a police office, and the like). It will be appreciated that: (1) a deployment of the UAVs 10 is restricted to a circular area; (2) each UAV has an isotropic antenna with matched polarization; and (3) all UAVs are synchronized to a common clock. Advantageously, multi-rotor UAVs are used because individually, they provide a versatile semi-stationary platform and as a network enables a mobile and reconfigurable topology. A multirotor UAV is built on modern technology yet remains a relatively simple machine. For instance, a quadrotor has four rotors held together with a rigid frame (see Reference 11). Control of such vehicles is basically accomplished through the differential manipulation of each rotor's thrust (see Reference 11). In contrast to fixed-wing aircraft, multirotor UAVs are under-actuated, with remaining degrees of freedom handled through system dynamics. Having demonstrated their effectiveness in many applications, such as transportation and construction (see Reference 12), surveillance and reconnaissance (see Reference 13), and wireless communication/networking (see Reference 14), they have become a popular research platform, one well suited for remote sensing applications.

Figure 2:
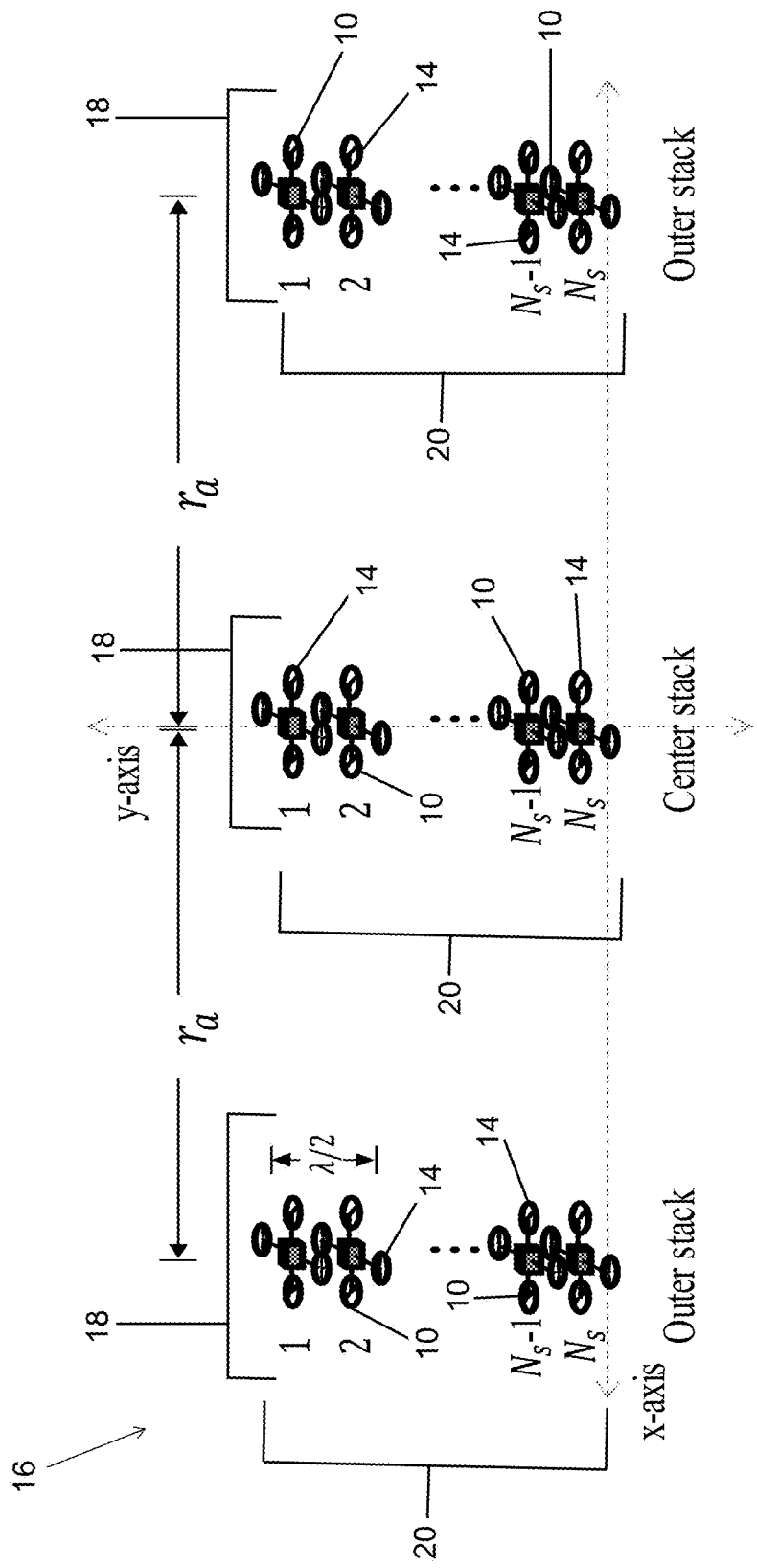
FIG. 2 is a schematic view of a wireless network including sensor nodes in accordance with one aspect of the present disclosure.

As shown in FIGS. 1 and 2, the UAVs 10 are initially deployed as one or more groups into an airborne symmetric line array (ASLA) formation, thereby forming an ad hoc elevated, mobile wireless sensor network 16 where each UAV constitutes a node of the network. The ASLA formation shown in FIGS. 1 and 2 places the UAVs 10 into three node groups or stacks 18, each containing an equal number of nodes 20 (e.g., 2 nodes, as shown in FIG. 2). These three stacks 18 of UAVs 10 are deployed along a longitudinal axis (not shown), such as, for example, the x-axis. A first stack 18 (i.e., a sink stack) is disposed at an origin and second and thirds stacks 18 flank both sides of the first stack at a distance of $r_a$. For source localization, this formation is used to minimize the estimate error variance (see references 8, 9, 10, and 31). For signal collection, this array is slightly curved (shown in FIGS. 5A and 5B) to match the circular wave front allowing for robust signal estimation and collection, as described in more detail below. It will be appreciated that at least three sensors 14 of the UAVs 10 are needed to receive the signal from the remote transmitter 12, thereby allowing the sensors to triangulate a position of the remote transmitter, as described in more detail below.

Figure 3:
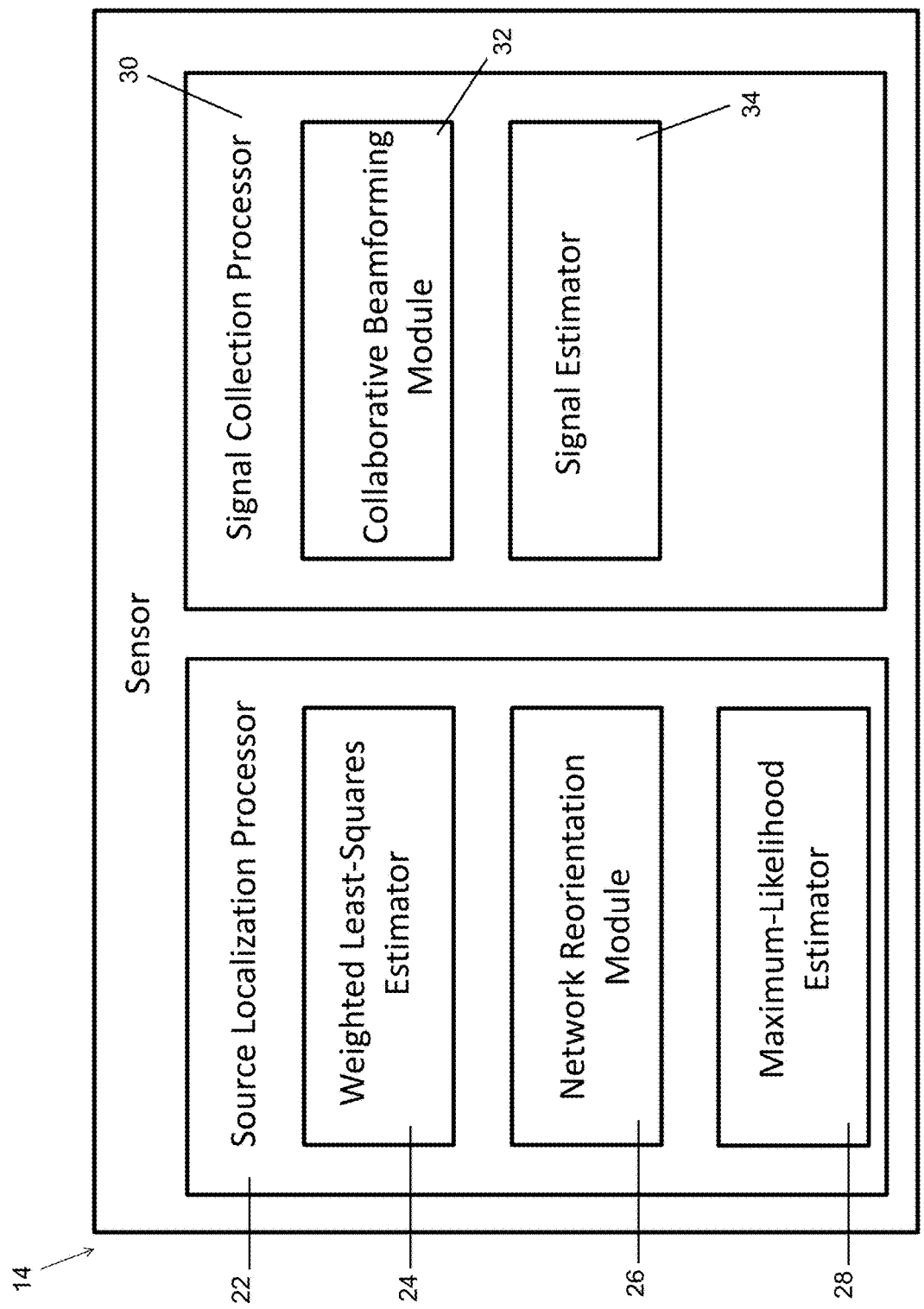
FIG. 3 shows a schematic view of one of the sensors of FIG. 2.

FIG. 3 shows an example embodiment of the sensors 14. The sensors 14 are configured to receive a signal that is emitted from the remote transmitter 12. The signal is indicative of an actual location of the remote transmitter 12. The sensors 14 can include one or more processors that are programmed to receive signals from the remote transmitter 12. For example, the sensors 14 include a source localization processor 22 that is programmed to estimate a first location of the remote transmitter 12 based on the emitted signal received by the sensor. The source localization processor 22 includes a weighted-least squares estimator 24, a network reorientation module 26, and a maximum-likelihood estimator 28, as described in more detail below.

The sensors 14 are associated with a first arrangement of the corresponding plurality of UAVs 10 relative to the remote transmitter 12 (shown in FIG. 4A). Once the UAVs 10 are positioned relative to the remote transmitter 12, as described above, the source localization processor 22 (FIG. 3) is programmed to estimate a first location of the remote transmitter 12 based on the emitted signal received by the sensor 14. Prior to estimating the first location of the remote transmitter, the weighted-least squares estimator 24 is programmed to apply a weighted least-squares estimation to the received signal to detect errors included therein. For example, the weighted-least squares estimator 24 is programmed to generate at least one time difference of arrival (TDOA) measurement from the received signal. Using the TDOA measurements, the weighted least-squares estimation is applied to the received signal. Advantageously, the weighted least-squares estimation does not require an initial position estimate and, thus, can be performed before a maximum-likelihood location estimation (described below).

After the weighted least-squares estimation is applied to the received signal, the maximum-likelihood estimator 28 applies a maximum-likelihood estimation to the received signal to determine the first location of the remote transmitter 12. The maximum-likelihood estimation provides a precise location estimate of the remote transmitter 12. To do so, the maximum-likelihood estimator 28 is an unbiased and efficient maximum-likelihood location estimator (see Reference 17). In addition, a robust measurement outlier rejection process (not shown) can be used to detect and reject erroneous TDOA measurements. This process is used to increase the localization phase's robustness to measurement error and sensor 10 position errors, as described in more detail below.

Based on the estimation of the first location of the remote transmitter 12, the first arrangement of the UAVs 10 relative to the remote transmitter is changed to a target arrangement of the plurality of UAVs relative to the remote transmitter based on the estimation of the first location of the remote transmitter. For example, FIG. 4A shows the UAVs 10 in a first arrangement relative to the remote transmitter 12. The UAVs 10 are longitudinally aligned at a distance of $r_a$ from each other, and offset from the remote transmitter at an undetermined angle. FIG. 4B shows the UAVs 10 in a target arrangement relative to the remote transmitter 12. The UAVs 10 are aligned with the remote transmitter 12 such that the first stack 18 (i.e., the sink stack) is substantially perpendicular to the remote transmitter to create an optimal sensor to target geometry (see Reference 10). This new orientation minimizes the geometric dilution of precision (see Reference 17), thus minimizing the maximum-likelihood estimator's error variance, as described in more detail below.

To change the arrangement of the UAVs 10 from the first arrangement to the target arrangement, a location estimate $(x_t, y_t)$ associated with the emitted signal is obtained (e.g. the estimated first location of the remote transmitter 12 obtained from the weighted least-squares estimation). From this location estimate, an angle $\theta_t$ of the emitter bearing estimate based on the location estimate $(x_t, y_t)$ is calculated using the network reorientation module 26. Using $\theta_t$, the network nodes 20 (e.g., the sensors 14 of the UAVs 10) are reoriented by the network reorientation module 26 to be substantially perpendicular to the target signal emitter, resulting in the reoriented network configuration as seen in FIG. 4B. Advantageously, the UAVs 10 are mobile, thereby allowing the UAVs to be re-oriented relative to the remote transmitter 12.

Once the UAVs 10 are reoriented relative to the remote transmitter 12, a second location of the remote transmitter is estimated based on the target arrangement of the plurality of sensors 14 and the corresponding plurality of UAVs relative to the remote transmitter. The second estimated location is more accurate of the actual location of the remote transmitter 12 than the first estimated location. The second location of the remote transmitter 12 can be estimating in substantially the same manner as described above (e.g., by using the weighted-least squares estimator 24 and the maximum-likelihood estimator 28). If necessary, the UAVs 10 can again be re-oriented (e.g., using the network reorientation module 26) until the target arrangement of the UAVs 10 (and, thus, the sensors 14) is obtained.

In some embodiments, after the UAVs 10 have been moved into the target arrangement relative to the remote transmitter 12, the received signal can be collected and amplified. While the mobility of each node 20 is allowed for optimal formations in the localization phase, it can cause array phase errors. To achieve the objective, despite the presence of such errors, the received signal is amplified using at least one of a collaborative beamforming process; and a signal estimation process.

Figure 5B:
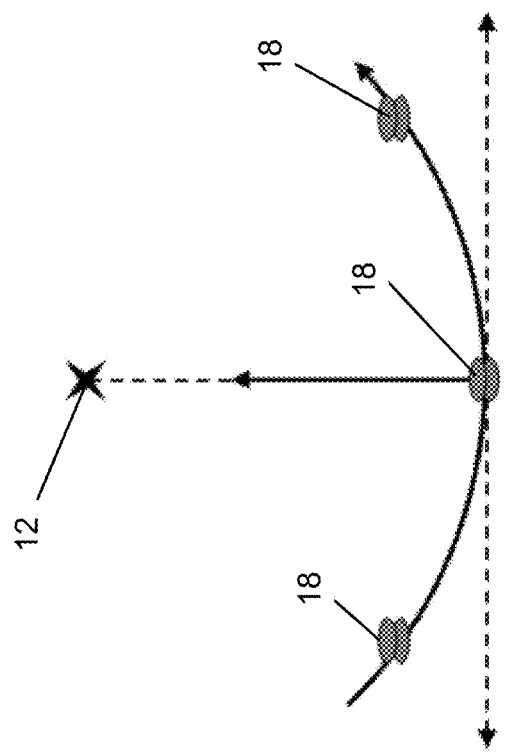
FIGS. 5A and 5B show another arrangement of the sensor nodes of FIG. 2.
Figure 5A:
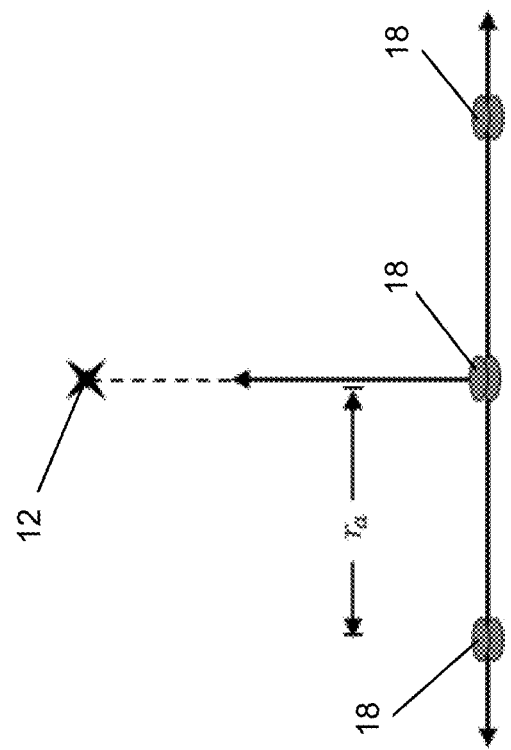

To amplify the signal, the sensors 14 include a signal collection processor 30 that includes a collaborative beamforming module 32 and a signal estimator 34 (see Reference 24). In some embodiments, after the UAVs 10 are in the target arrangement, the second and third stacks 18 are moved relative to the first stack 18 (i.e., the sink stack), which remains fixed, so that the second and third stacks are in a curved array relative to the first stack. This curved array formation conforms to the incoming circular wave front, as shown in FIGS. 5A and 5B. For example, this new curved ASLA formation contains three groups of sensors 14 placed symmetrically along a curved line with the center group at the origin. The new position of the outer sensor 14 groups is based on the location estimate of the remote transmitter 12. This new formation is used to match the circular wave front of the incoming signal from the remote transmitter 12, thus allowing for the coherent combining of each collected signal based solely on the position of each sensor node 20. Advantageously, this new arrangement allows for the coherent combining, i.e., collaborative beamforming of the received signal by the collaborative beamforming module 32 and the signal estimator 34 without the use of phase shifting at each element. Since this method does not require phase shifting it is also capable of collecting wideband signals.

As the circular wave front signal from the remote transmitter 12 impinges on the circular ASLA formation, each node 20 in a group provides a noisy sample of the same signal. A sample mean of the sample is then calculated. Using each mode's 20 sample mean in a collaborative phase shift beamformer, the signal can be reconstructed and amplified.

Furthermore, since the ASLA formation's array factor contains grating lobes due to its large inter-stack distance, it is extra sensitive to interfering signals. To increase the robustness of signal collection against such signals, virtual filling (see References 32 and 33) is used. This array processing technique is used to manage the array's inherent side lobes and grating lobes in order to minimize the effects of interfering signals. It will be appreciated that this approach uses fixed uniform beamforming weights, this method amplifies the emitted signal received from the remote transmitter 12 using array rotation and suppresses undesirable signal through the use of virtual filling and tapering techniques.

Figure 6:
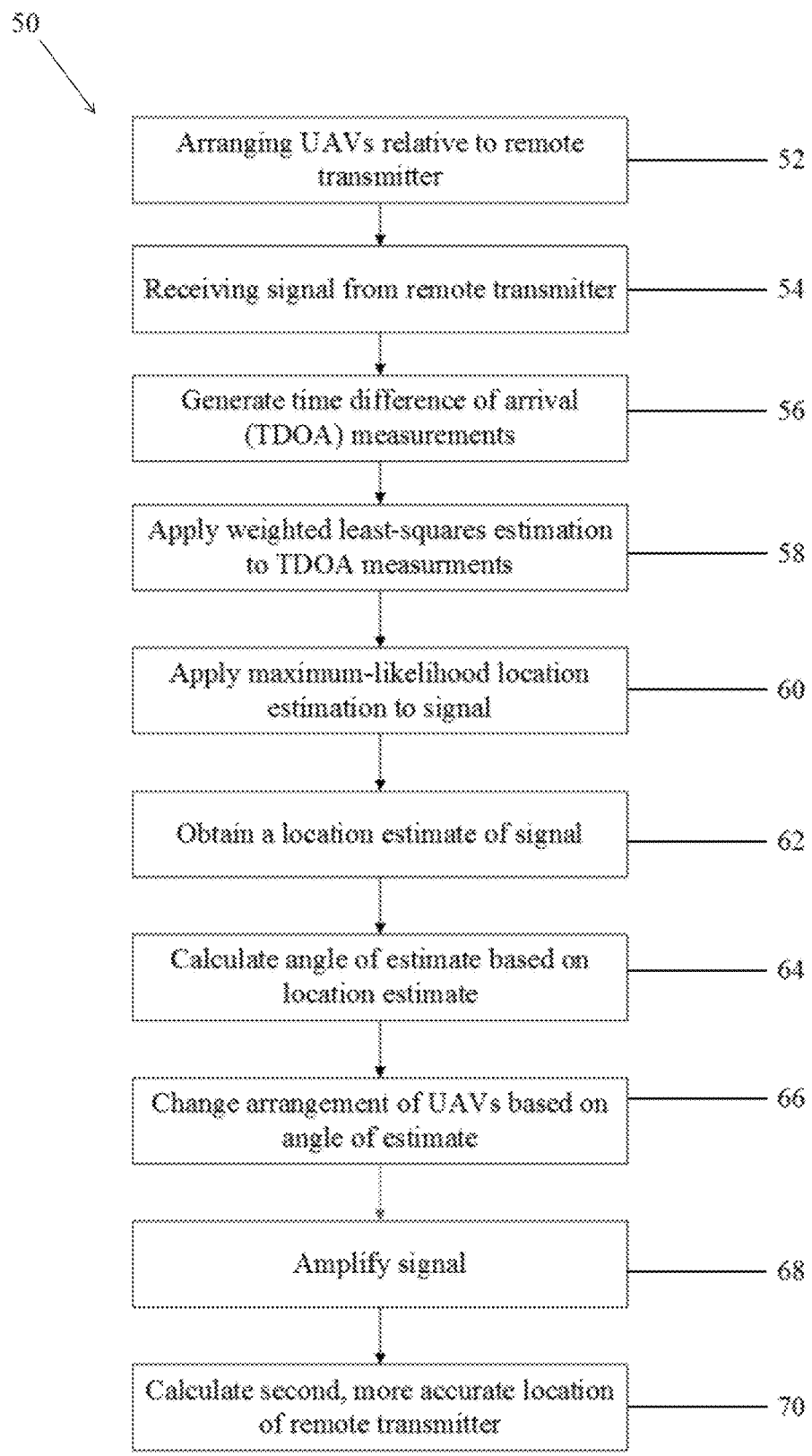
FIG. 6 shows a flow chart of an exemplary use of the system of FIG. 1.

FIG. 6 shows an exemplary method 50 of use of the UAVs 10. The method 50 includes: arranging groups of unmanned aerial vehicles (UAVs) arranged relative to a remote transmitter (52); receiving an emitted signal from the remote transmitter (54); generate at least one time difference of arrival measurement from the received signal (56); apply a weighted least-squares estimation to the received signal using the at least one time different of arrival measurement (58); apply a maximum-likelihood estimation to the received signal to determine the first location of the remote transmitter (60); estimating a first location of the remote transmitter based on the received signal by obtaining a location estimate associated with the emitted signal (62); calculating an angle of an emitter bearing estimate based on the location estimate (64); change an arrangement of the UAVs relative to the remote transmitter based on the angle of the emitter bearing estimate such that the UAVs are arranged to be substantially perpendicular to the remote transmitter (66); amplify the received signal using at least one of a collaborative beamforming process and a signal estimation process (68); and calculating a second location of the remote transmitter based on the arrangement of the UAVs relative to the remote transmitter in which the second location is more accurate of the actual location of the remote transmitter than the first location (70).

EXAMPLES

Example 1—Sensor Node Position Error

As the signal is received by the sensors 14, the position information of each node 20 is assumed known. Fluctuations in the positions of each node 20 due to their station keeping operations are also assumed (see Reference 15). The effects of these position errors are a concern. With each node 20 in the network 16 envisioned as a multi-rotor UAV 10, the actual position errors are mainly governed by wind, GPS accuracy, and flight controller scheme (see References 15 and 16). In the absence of such knowledge, the Gaussian position error distribution is resorted to. More specifically, we model these small fluctuations in the x and y positions as two independent and identically distributed Gaussian random variables $\delta_x$ and $\delta_y$, respectively. Both random variables are zero mean with a variance of $\sigma_p^2$ (see Reference 15). Their probability density functions are expressed as $$f_{\Delta_x}(\delta_x) = \frac{1}{\sqrt{2\pi\sigma_p^2}} \exp\left(-\frac{\delta_x^2}{2\sigma_p^2}\right), \quad -\infty \leq \delta_x \leq \infty; \quad (1)$$

and $$f_{\Delta_y}(\delta_y) = \frac{1}{\sqrt{2\pi\sigma_p^2}} \exp\left(-\frac{\delta_y^2}{2\sigma_p^2}\right), \quad -\infty \leq \delta_y \leq \infty. \quad (2)$$

Example 2—Initial Localization Via Weighted Least Squares Estimation

The objective is to estimate the location of a single source emitter located at $(x_t, y_t)$. The sensor network is deployed in the initial ASLA configuration, as seen in FIG. 4A. In this configuration, the network detects an incoming emission and generates a set of time difference on arrival measurements. Using these measurements in the weighted least squares estimator 24, we obtain a location estimate. This initial localization is a closed-form estimator that does not require any initialization (see References 19 and 20).

Since weighted least squares estimation is primarily for linear models, its applicability to hyperbolic estimation is not immediately obvious. To do this, we define the noisy range difference-of-arrival (RDOA) measurement of a sensor pair (see References 19 and 20) as $$d_{i,k} = d_{i,k}^0 + \varepsilon_{i,k}, \quad i,k=1, \ldots, M, \quad (3)$$

where $d_{i,k}^0$ is the true range difference between sensors i and k and $\varepsilon_{i,k}$ is the zero mean Gaussian range difference measurement error. Then the range from the $i^{th}$ sensor to the source emitter is determined (see Reference 20) as $$r_i = \sqrt{(x_i-x_t)^2 + (y_i-y_t)^2}. \quad (4)$$

By squaring both sides of (4), we obtain $$r_i^2 = K_i - 2x_i x_t - 2y_i y_t + x_t^2 + y_t^2, \quad i=1, \ldots, M, \quad (5)$$

where $K_i = x_i^2 + y_i^2$ and $r_{i,1} = cd_{i,1} = r_i - r_1$. In this form, we can formulate a linear weighted least squares problem in which the sensors are placed in a line. By substituting $r_i^2 = (r_{i,1} + r_1)^2$ in (5), we get $$r_{i,1}^2 + 2r_{i,1} r_1 + r_1^2 = K_i - 2x_i x_t - 2y_i y_t + K_t. \quad (6)$$

By co-locating the origin with the first sensor in the center stack and making it the reference sensor, we get $r_t = r_1$, and $K_t = K_1$, then (6) can be expressed as $$r_{i,1}^2 + 2r_{i,1} r_1 = -2x_{i,1} x_t - 2y_{i,1} y_t + K_i - K_1. \quad (7)$$

Finally, with all the sensors in a line, we replace $-2x_{i,1} x_t - 2y_{i,1} y_t$ by $-2x_{i,1}(x_t + \alpha_t y_t)$ where $\alpha_t$ is some constant. With this substitution, (7) becomes $$r_{i,1}^2 - K_i + K_1 = -2x_{i,1}(x_t + \alpha_t y_t) - 2r_{i,1} r_1. \quad (8)$$

With (8) now linear in $r_1$ and $(x_t + \alpha_t y_t)$, a WLS solution can be obtained as [20], [19]

$$\hat{\omega}_{WLS} = \begin{bmatrix} (\hat{x}_t + \alpha_t \hat{y}_t) \\ \hat{r}_t \end{bmatrix} = (G_l^T C_\varepsilon^{-1} G_l)^{-1} G_l^T C_\varepsilon^{-1} h, \quad (9)$$

where $$G_l = \begin{bmatrix} x_{2,1} & r_{2,1} \\ x_{3,1} & r_{3,1} \\ \vdots & \vdots \\ x_{M,1} & r_{M,1} \end{bmatrix} \text{ and} \quad (10)$$

$$h = \begin{bmatrix} r_{2,1}^2 - x_2^2 \\ r_{3,1}^2 - x_3^2 \\ \vdots \\ r_{M,1}^2 - x_M^2 \end{bmatrix} \quad (11)$$

and $C_\varepsilon^{-1}$ is the inverse covariance matrix of the TDOA measurement vector from (3). When all the sensors are located on the x-axis, $y_{i,1}=0$ for $i=2, \ldots, M$, resulting in $\alpha_t=0$. The solution is then expressed as $$\hat{\omega}_{WLS} = \begin{bmatrix} \hat{x}_t \\ \hat{r}_t \end{bmatrix} = (G_l^T C_\varepsilon^{-1} G_l)^{-1} G_l^T C_\varepsilon^{-1} h. \quad (12)$$

Using (12), we calculate the y-coordinate estimate using the expression $$\hat{y}_t = \sqrt{\hat{r}_t^2 - \hat{x}_t^2} \quad (13)$$

Example 3—Refined Localization Via Maximum-Likelihood Estimation

The ML estimator also requires the system of equations to be linear. The term "maximum-likelihood" is used because the solution maximizes the likelihood function, i.e., the statistical model of the estimate matches that of the measurements. Since the ML estimator is both asymptotically unbiased and efficient, i.e., achieves the Cramer-Rao lower bound (CRLB) (see References 21 and 22), it has become widely adopted in the field of parameter estimation.

To derive the ML solution, we consider an M×1 noisy TDOA measurement vector given by $$y = z(\omega, x) + \varepsilon, \quad (3)$$

where $\omega$ is the $N_\omega \times 1$ vector of unknown but nonrandom set of parameters to be estimated, $z(\omega, x)$ is a function of $\omega$ and the input vector x, and $\varepsilon$ is the zero mean Gaussian measurement error. The likelihood of y for a given $\omega$ is governed by its conditional probability density function and is expressed as (see Reference 17)

$$f_{y|\omega}(y|\omega) = \quad (4)$$

$$\frac{1}{(2\pi)^{M/2} \sqrt{|C_\varepsilon|}} \times \exp(-(1/2)[y - z(\omega, x)]^T C_\varepsilon^{-1} [y - z(\omega, x)]),$$

where |·| denotes the determinant of a matrix, and $C_\varepsilon$ is the covariance matrix of the measurement error $\varepsilon$ and is defined as $$C_\varepsilon = E\{(\varepsilon_{ML} - E\{\varepsilon_{ML}\})(\varepsilon_{ML} - E\{\varepsilon_{ML}\})^T\}. \quad (5)$$

Finally, the ML estimator of $\omega$ can be obtained by minimizing the exponent quadratic of (4) (see Reference 17)

$$Q_{ML} = [y - z(\omega, x)]^T C_\varepsilon^{-1} [y - z(\omega, x)]. \quad (6)$$

Since $z(\omega,x)$ is nonlinear, i.e., the relationship between y and x is not a linear parameterization of $\omega$, we must linearize it before we can correctly implement the ML estimator (see Reference 17). The standard solution is then to linearize the functions through a Taylor series expansion about a reference point $\omega_r$. Using only the first two terms of the expansion, we have the following approximation (see Reference 17)

$$z_T(\omega,x) \approx z(\omega,x) + G_{ts}(\omega - \omega_r), \quad (7)$$

where $G_{ts}$ is the $M \times N_{ML}$ gradient matrix given by $$G_{ts} = \begin{bmatrix} \frac{\partial z_1}{\partial \omega_1}\big|_{\omega=\omega_r} & \cdots & \frac{\partial z_1}{\partial \omega_{N_{ML}}}\big|_{\omega=\omega_r} \\ \vdots & & \vdots \\ \frac{\partial z_M}{\partial \omega_1}\big|_{\omega=\omega_r} & \cdots & \frac{\partial z_M}{\partial \omega_{N_{ML}}}\big|_{\omega=\omega_r} \end{bmatrix}. \quad (8)$$

The ML estimator can then be obtained as (see Reference 17)

$$\hat{\omega}_{ML} = \omega_r + (G_{ts}^T C_\varepsilon^{-1} G_{ts})^{-1} G_{ts}^T C_\varepsilon^{-1} (y - z(\omega_r, x)) \quad (9)$$

The extension the ML estimator to hyperbolic localization is done in a similar fashion to that of the WLS estimator. We begin by accounting for time-of-arrival measurements as $$t = t_0 \mathbf{1}_M + D/c + \varepsilon \quad (10)$$

where D is an $M \times 1$ vector containing the range from the emitter to each node, $t_0$ is the time of signal emission, $\mathbf{1}_M$ is an $M \times 1$ vector of ones, and $\varepsilon$ is an $M \times 1$ vector containing the time of arrival (TOA) measurement errors. To convert the TOAs to TDOAs, we subtract the $i^{th}$ TOA measurement from the first TOA measurement to eliminate $t_0$. This results in $$t_1 - t_i = t_0 - t_0 + (D_1 - D_i)/c + \varepsilon_1 - \varepsilon_i \quad (11)$$

To put it in matrix form, we multiply (10) by the $(M-1) \times M$ matrix (see Reference 17)

$$G_M = \begin{bmatrix} 1 & -1 & 0 & \cdots & 0 \\ 1 & 0 & -1 & \ddots & \vdots \\ \vdots & \vdots & \ddots & \ddots & 0 \\ 1 & 0 & \cdots & 0 & -1 \end{bmatrix} \quad (12)$$

to get $$y_{TD} = G_M D/c + G_M \varepsilon. \quad (13)$$

where $y_{TD} = G_M t$ is an $(M-1) \times 1$ vector containing all the resulting time-difference-of-arrival measurements.

From (9), we set $\omega_r = \hat{\omega}_{WLS}$, and the ML estimator's solution in polar coordinates can be expressed as $$\hat{\omega}_t \begin{bmatrix} \hat{r}_t \\ \hat{\theta}_t \end{bmatrix} = \quad (14)$$

$$\hat{\omega}_{WLS} + c(H^T G_M^T C_\varepsilon^{-1} G_M H)^{-1} \times H^T G_M^T C_\varepsilon^{-1} (y_{TD} - (G_M D_0)/c),$$

where $\hat{\omega}_{WLS}$ is the WLS estimate in polar coordinates, $D_0$ is the $(M-1) \times 1$ vector containing the distances between the reference point and the sensor nodes and H is the $(M-1) \times 2$ matrix expressed as $$H = \begin{bmatrix} \frac{r_m - r_r \cos(\theta_m - \theta_r)}{D_{0,m}} & \frac{r_m r_r \sin(\theta_m - \theta_r)}{D_{0,m}} \\ \vdots & \vdots \\ \frac{r_M - r_r \cos(\theta_M - \theta_r)}{D_{0,M}} & \frac{r_M r_r \sin(\theta_M - \theta_r)}{D_{0,M}} \end{bmatrix}, \quad (15)$$

with m=2, . . . , M, $r_m$ and $\theta_m$ the $m^{th}$ node's range and bearing, respectively, $r_r$ and $\theta_r$ are the reference point's range and bearing, respectively, $D_{0,m}$ the $m^{th}$ element of $D_0$, and the product $G_M H$ is the hyperbolic version of (8).

Example 4—Beamforming from an Elevated, Mobile Wireless Sensor Network

The benefits and various applications of traditional beamforming have been well documented (see Reference 23). Beamforming in the context of wireless sensor networks (WSNs) has given rise to the concept of collaborative beamforming [24], in which a network of distributed sensors is used to perform beamforming from a synchronized WSN. From (see Reference 23), the combined signal of a linear phase shift beamforming array, commonly called the array factor is expressed as $$A(\theta_t, \theta_{sa}) = \sum_{i=1}^{M} e^{-j(i-1)\beta d \sin \theta_{sa}} e^{j\alpha_i}, \quad (16)$$

where d is the internode distance, $\theta_t$ is the signal bearing, $\theta_{sa}$ is the array steering angle, i.e., the direction of the main beam gain, $\alpha_i$ is the $i^{th}$ node's signal phase expressed as $$\alpha_i = \beta(x_i \sin \theta_t + y_i \cos \theta_t), \quad (17)$$

M is the number of sensor nodes, and $\beta = 2\pi/\lambda$ with $\lambda$ being the signal wavelength. From (16), to steer the arrays beam to the intended target signal we set $\theta^{sa} = \theta_t$, thus the arrays maximum gain is achieved in the direction of $\theta_t$. Given no array errors and perfect network synchronization, this beamformer can yield a signal to noise ratio (SNR) of (see Reference 25)

$$\rho_M = M\rho_n, \quad (18)$$

where $\rho_n$ is the SNR of any one node in the array. A key aspect of this beamformer is its dependency on the accurate knowledge of $\theta_t$ (see References 23 and 26). For this reason, our scheme is preceded by a hyperbolic localization technique in order to provide an estimate of $\theta_t$.

From reference 23, we rewrite (16) to represent the array factor of a planar array as $$A_{FP}(\theta_{sa}, \theta_t) = \sum_{i=1}^{M} w_i e^{j\alpha_i}, \quad (19)$$

where $w_i$ is the $i^{th}$ node's complex weight expressed as $$w_i = \exp(-j\beta(x_i \sin \theta_{sa} + y_i \cos \theta_{sa})). \quad (20)$$

Incorporating Gaussian position errors $\delta_x$ and $\delta_y$ (see (1) and (2)) into (20) yields $$\tilde{\alpha}_i = \beta((x_i + \delta_{x,i}) \sin \theta_t + (y_i + \delta_{y,i}) \cos \theta_t). \quad (21)$$

Separating the sensor position from its position errors, we get $$A_\varepsilon(\theta_{sa}, \theta_t, \delta_x, \delta_y) = \sum_{i=1}^{M} w_i \exp(j\alpha_i) \exp(j\alpha_{p,i}), \quad (22)$$

where $$\alpha_{p,i} = \beta(\delta_{x,i} \sin \theta_t + \delta_{y,i} \cos \theta_t) \quad (23)$$

is the $i^{th}$ node's phase perturbation due to position errors. To steer the array to the intended signal's direction $\theta_t$, we set $\theta_{sa}$ equal to $\theta_t$. As a result, $w_i\exp(j\alpha_i)=1$, and the array factor becomes the expression for the main beam gain $$G_{MB}(\theta_t,\delta_x,\delta_y) = A_e(\theta_{sa},\theta_t,\delta_x,\delta_y)|_{\theta_{sa}=\theta_t,constant} = \sum_{i=1}^{M} e^{j\beta(\delta_{x,i}\sin\theta_t + \delta_{y,i}\cos\theta_t)}, \quad (24)$$

Example 5—Effects of Gaussian Position Errors on the Main Beam Response

To analyze the effects of Gaussian distributed node position errors on the array's main beam response, we examine the main beam response after the ASLA formation has been reoriented as shown in FIG. 4B. In this configuration, we assume that $\theta_t=\theta_{sa}=0$ deg. This assumption allows us to study the effects of Gaussian position errors independent of errors in the bearing estimate $\hat{\theta}_t$. As a result of this assumption, the main beam gain from (24) can be expressed as $$G_{MB}(\delta_y) = \sum_{i=1}^{M} e^{j\beta\delta_y}, \quad (25)$$

where $e^{j\beta\delta_{y,i}}$ is known as the wrapped Gaussian random variable (see Reference 27). By letting $$w_{g,i} = e^{j\beta\delta_{y,i}} \quad (26)$$

we can interpret the main beam gain as the sum of M wrapped Gaussian random variables $w_g$, each with a mean of zero and variance $\sigma_g^2=(\beta\sigma_p)^2$ [27]. The probability density function of the wrapped Gaussian random variable is given by (see Reference 27)

$$f_{W_g}(w_g,\sigma_g^2) = \frac{1}{\sqrt{2\pi\sigma_g^2}} \times \sum_{k=-\infty}^{\infty} \exp\left(-\frac{(w_g+2\pi k)^2}{2\sigma_g^2}\right). \quad (27)$$

The mean values of the magnitude and phase, respectively, are given by (see Reference 27)

$$\text{magnitude}\{\mu_w\} = e^{-(\beta\sigma_p)^2/2} \quad (28)$$

and $$\text{angle}\{\mu_w\} = 0. \quad (29)$$

The variance is given as $$\sigma_w^2 = 1 - e^{(\beta\sigma_p)^2/2}. \quad (30)$$

Assuming that all $\delta_{y,i}$ are independent and identically distributed random variables, we have that $w_{g,i}$ for $i=1,\ldots,M$ are also independent and identically distributed. Given that $G_{MB}(\theta_t, \delta_x, \delta_y)$ is the sum of these M random variables, we express its mean value of its magnitude and phase as $$\text{magnitude}\{\mu_{MB}\} = Me^{-(\beta\sigma_p)^2/2}, \quad (31)$$

and $$\text{angle}\{\mu_{MB}\} = 0 \quad (32)$$

with a corresponding variance of $$\sigma_{MB}^2 = M\left(1 - e^{-(\beta\sigma_p)^2/2}\right). \quad (33)$$

To support the theory presented in this section, two simulations were conducted using an $N_s=30$ ASLA configured network, with Gaussian position errors. In these simulations, the source emitter is located at a bearing of $\theta_t=0$ deg, $\lambda=1$, $r_a=200$ m, and all data points are the result of 1,000 trials.

Figure 7:
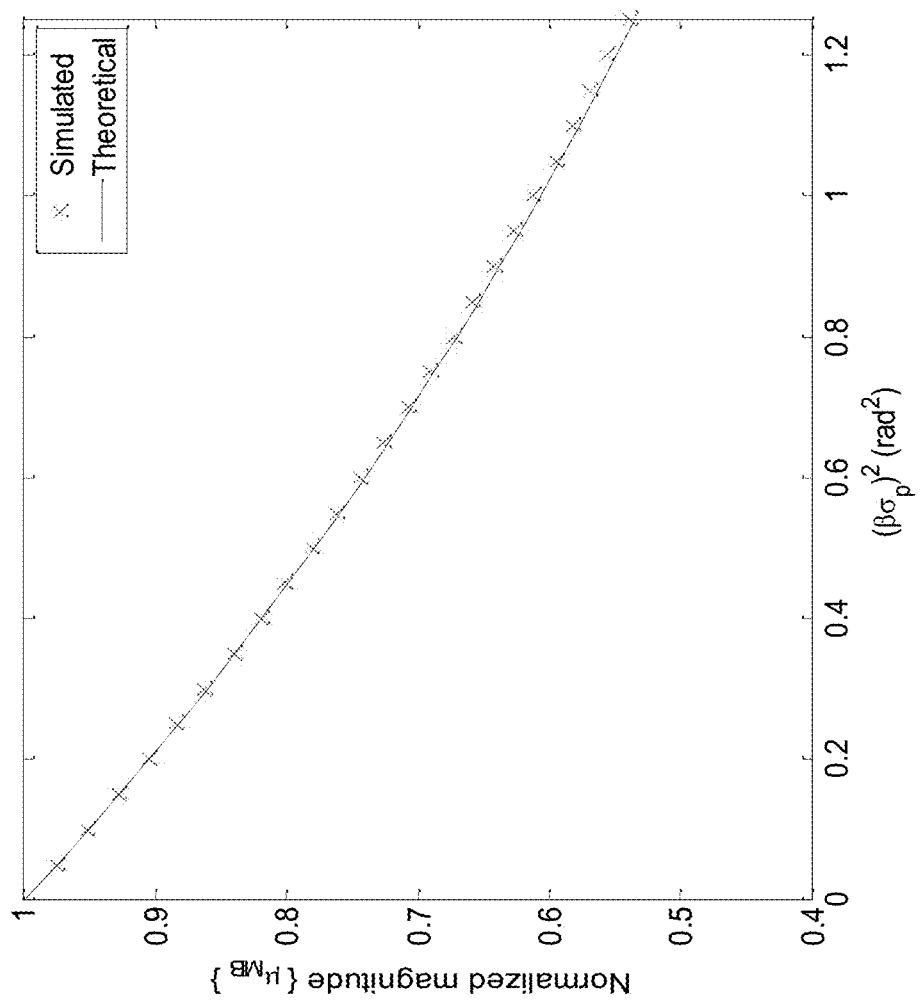
FIG. 7 shows a plot of normalized values of magnitude versus position error variance.

A plot of the simulation and theoretical normalized values of magnitude$\{\mu_{MB}\}$ as a function of $\sigma_g^2=(\beta\sigma_p)^2$ is shown in FIG. 7. From the plot, we see that the simulation results closely follow the theoretical. The results indicate that the main beam gain monotonically decreases as $\sigma_g^2$ increases. This suggests that phase perturbations due to node position errors can significantly reduce the gain of collaborative beamforming.

Figure 8:
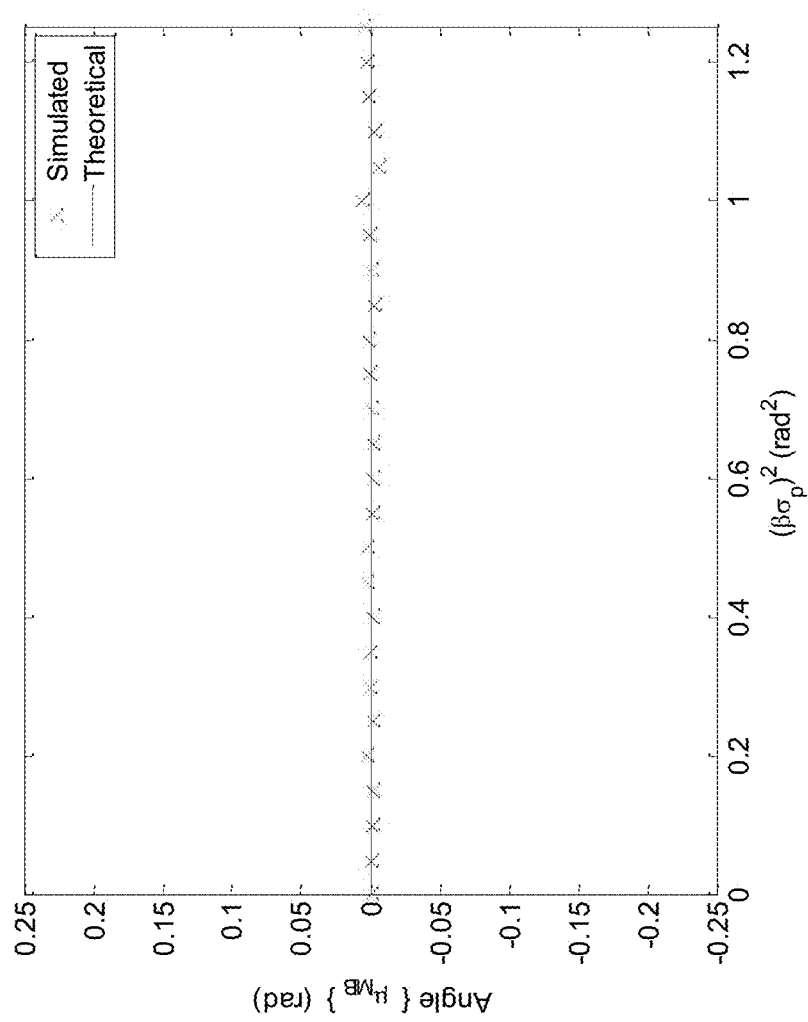
FIG. 8 shows a plot of normalized values of angle versus position error variance.

Similar to the previous simulation, a comparison between the simulation and theoretical values of angle$\{\mu_{MB}\}$ as a function of $\sigma_g^2=(\beta\sigma_p)^2$ is shown in FIG. 8. From the results, we see that the simulation results closely follow the theoretical value, with the angle $\{\mu_{MB}\}$ values approximately equal to zero at all values of $\sigma_g^2$ simulated. This suggests that the effects of Gaussian position errors have no effect on the mean value of the main beam phase angle. Since position errors do not affect the angle$\{\mu_{MB}\}$, it will have a prominent role in the signal estimation described in the following section.

Example 6—Signal Collection

Considering an ASLA configured network with Gaussian distributed position errors, we represent a snapshot of the complex signal received at the $i^{th}$ node of the center stack as $$n_{C,i} = e^{j\phi_t} e^{j\beta(\delta_{x,i}\sin\theta_t + \delta_{y,i}\cos\theta_t)}, \quad (34)$$

where $i=1,\ldots,N_s$, and $V_t$ and $\phi_t$ are the signal's magnitude and phase, respectively. Using the same assumptions used to derive (25), we express (34) as $$n_{C,i} = V_t e^{j(\phi_t + \rho_{\epsilon,i})} \quad (35)$$

where $\rho_{\epsilon,i} = \beta\delta_{y,i}$ is a Gaussian random variable representing the ith node's phase perturbation due to position errors in the y-direction. The resulting complex signal is then represented as two random variables (see Reference 28)

$$n_{C,i} = n_{C_I,i} + jn_{C_Q,i}, \quad (36)$$

where $$n_{C_I,i} = V_t \cos(\phi_t + \rho_n), \quad (37)$$

with $\rho_n = \beta\delta_y$ and $\delta_y$ being zero mean Gaussian position error with a variance of $\sigma_p^2$ and $$n_{C_Q,i} = V_t \sin(\phi_t + \rho_n). \quad (38)$$

We then consider $n_{C_I}$ and $n_{C_Q}$ as two random variables representing a given stack's received in-phase and quadrature components, respectively. The random variables $n_{C_I,i}$ and $n_{C_Q,i}$ can be interpreted as the $i^{th}$ instance of the true $n_{C_I}$ and $n_{C_Q}$ that are perturbed by node position errors. Also, the mean values of all the instances would then be the sample means of $n_{C_I}$ and $n_{C_Q}$. Since we have shown that position errors do not affect the mean value of the signal phase, we can use the sample mean of $n_{C_I}$ and $n_{C_Q}$ to derive an estimate of the true signal phase. Overall, by deriving an expression for the mean of $n_{C_I}$ and $n_{C_Q}$, we can also determine a way to estimate the true signal phase.

Focusing on the in-phase component first, the expression $\phi_t + \rho_n$ can be expressed as a Gaussian random variable $\delta_g$ with a mean of $$\mu_g = \phi_t \quad (39)$$

and variance of $$\sigma_g^2 = (\beta\sigma_p)^2. \quad (40)$$

By substituting $\delta_g$ into $n_{C_I}$, we get $$n_{C_I} = \cos(\delta_g). \tag{41}$$

To derive the resulting probability density function of $n_{C_I}$, we first define its cumulative distribution function as $$F_{N_{C_I}}(n_{C_I}) = Pr[g(\delta_g) \le n_{C_I}] \tag{42}$$

$$= \int_{g(\delta_g) \le n_{C_I}} f_{H_g}(\delta_g) d\delta_g,$$

where $g(\delta_g) = \cos(\delta_g)$. Since a Gaussian random variable is define between $-\infty$ and $\infty$, $\delta_g$ can be defined by the inverse transform of $g(\delta_g)$ over the interval [27]

$$2\pi k + \cos^{-1}(n_{C_I}) \le \delta_g < 2\pi(1+k) - \cos^{-1}(n_{C_I}). \tag{43}$$

The probability density function of $n_{C_I}$ is then expressed as (see References 27 and 29), $$f_{N_{C_I}}(n_{C_I}) = \tag{44}$$

$$\sum_{k=-\infty}^{\infty} \left|\frac{d\delta_g}{dn_{C_I}}\right| [f_H(2\pi k + \cos^{-1}(n_{C_I})) + f_H(2\pi(1+k) - \cos^{-1}(n_{C_I}))],$$

where $$\left|\frac{d\delta_g}{dn_{C_I}}\right| = \frac{1}{\sqrt{1-n_{C_I}^2}}. \tag{45}$$

By expanding (44), we get the final expression for the probability density function of $n_{C_I}$ as $$f_{N_{C_I}}(n_{C_I}) = \tag{46}$$

$$\sum_{k=-\infty}^{\infty} \frac{1}{\sqrt{1-n_{C_I}^2}} \frac{1}{\sqrt{2\pi\sigma_g^2}} \times \left(\exp\left(-\frac{A_\gamma - \phi_t}{2\sigma_g^2}\right) + \exp\left(-\frac{B_\gamma - \phi_t}{2\sigma_g^2}\right)\right),$$

where $A_\gamma = 2\pi k + \cos^{-1}(n_{C_I})$ and $B_\gamma = 2\pi(1+k) - \cos^{-1}(n_{C_I})$.

Figure 9:
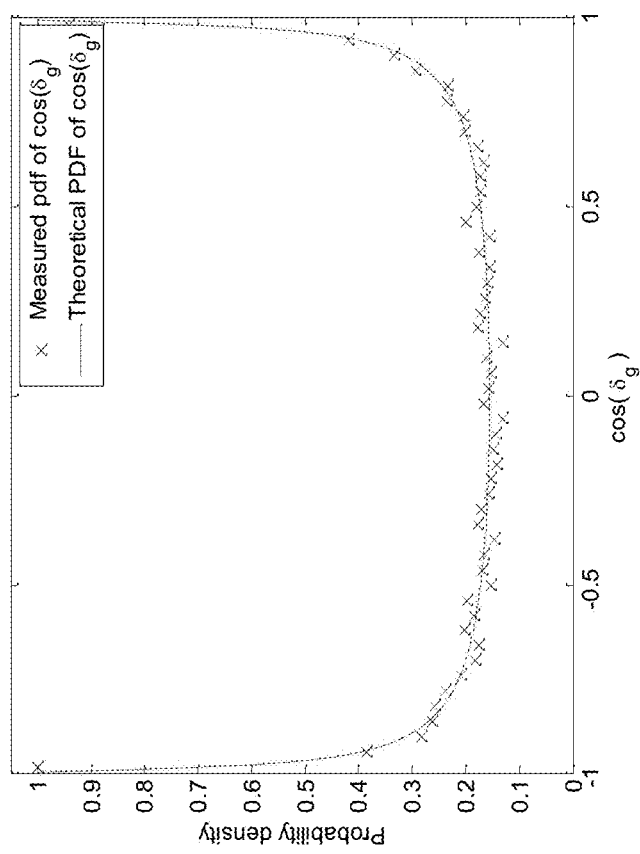
FIG. 9 shows a comparison of measured and theoretical probability density function of $n_{c1}$.

To support the validity of this expression, a comparison of the histogram of $n_{C_I} = \cos(\delta_g)$ with the response of (46) over the same interval is shown in FIG. 9 For this simulation, 10,000 instances of $\delta_g$ generated to form a histogram with 50 bins, $\sigma_g^2 = (2\pi/5)^2$, and $$f_{N_{C_I}}(n_{C_I})$$

is calculated with k=0,1. As observed from the results, the simulated histogram closely follows the theoretical values of (46).

Example 7—Mean Value of the in-Phase and Quadrature Components with Gaussian Position Errors With the probability density function of $n_{C_I}$ defined as a function of $\phi_t$ and $\sigma_g^2$, we can derive an estimate of $\phi_t$ at a given stack based on the sample mean of $n_{C_I}$ and knowledge of $\sigma_g^2$. Since it is difficult to derive an expression for the mean using the probability density function of $n_{C_I}$, we take an alternative approach using Euler's formula $$e^{j\delta_g} = \cos\delta_g + j\sin\delta_g. \tag{47}$$

We will first consider the case where $\delta_g$ is Gaussian with a mean value of zero and a variance of $\sigma_g^2$. Note that the mean value of $\delta_g$ is indeed equal to $\phi_t$ (see (39)), but we will first examine this simpler zero mean case in order to derive the non-zero mean case. The mean of the cosine term is then given as (see Reference 30)

$$E\{\cos\delta_g\} = \exp(-\sigma_g^2/2), \tag{48}$$

and $$E\{\sin\delta_g\} = 0. \tag{49}$$

Using the trigonometric identity $$\cos^2\delta_g = \frac{1}{2}(1+\cos(2\delta_g)), \tag{50}$$

the variance of $\cos\delta_g$ can be expressed as $$\text{var}\{\cos\delta_g\} = E\{\cos^2\delta_g\} - E\{\cos\delta_g\}^2. \tag{51}$$

By substituting (48) and (50) into (51), we get $$\text{var}\{\cos\delta_g\} = \frac{1}{2}\left(1 + e^{-(2\sigma_g)^2/2}\right) - e^{-\sigma_g^2} = \frac{1}{2}\left(1 - e^{-\sigma_g^2}\right)^2. \tag{52}$$

Similarly, the variance of $\sin\delta_g$ is given by $$\text{var}\{\sin\delta_g\} = E\{\sin^2\delta_g\} - E\{\sin\delta_g\}^2 = \frac{1}{2}\left(1 - e^{-2\sigma_g^2}\right). \tag{53}$$

Finally to consider the case where $\delta_g$ is not zero mean, where $\delta_g$ is a Gaussian random variable with mean $\mu_g = \phi_t$ and variance equal to $\sigma_g^2$. If this is true, then $\delta_0 = \delta_g - \mu_g$ where $\delta_0$ is the zero mean case of $\delta_g$. Thus, using the trigonometric identity $\cos(x+y) = \cos x \cos y - \sin x \sin y$, the mean of $\cos(\delta_g)$ can be expressed as $$E\{\cos\delta_g\} = E\{\cos(\delta_0 + \mu_g)\} = E\{\cos\delta_0 \cos\mu_g - \sin\delta_0 \sin\mu_g\} = e^{-\sigma_g^2/2}\cos\mu_g. \tag{54}$$

Similarly, $$E\{\sin\delta_g\} = E\{\sin(\delta_0 + \mu_g)\} = e^{-\sigma_g^2/2}\sin\mu_g. \tag{55}$$

Since $n_{C_I} = \cos(\delta_g)$, the mean of $n_{C_I}$ is given as $$E\{n_{C_I}\} = e^{-\sigma_g^2/2}\cos\mu_g. \tag{56}$$

Following the same derivation, the mean of $n_{C_Q}$ is expressed as $$E\{n_{C_Q}\} = e^{-\sigma_g^2/2}\sin\mu_g. \tag{57}$$

Given that the signal phase is perturbed by sensor position errors, we see from (32) the mean value of the signal's phase remains largely unaffected. This makes the sample mean of a given stack's signal phase a suitable parameter from which to estimate the true signal phase.

One means of estimating the signal phase is by solving (56) or (57) for $\phi_t$ (note $\mu_g = \phi_t$), to obtain the phase estimate for the center stack $$\hat{\phi}_{t,c} = \cos^{-1}\left(\hat{\mu}_{n_{C_I}} / e^{-\sigma_g^2/2}\right) = \sin^{-1}\left(\hat{\mu}_{n_{C_Q}} / e^{-\sigma_g^2/2}\right), \tag{58}$$

where $$\hat{\mu}_{n_{C_I}} \text{ and } \hat{\mu}_{n_{C_Q}}$$

are the signal's in-phase and quadrature component's sample mean for the center stack. This method, although valid, only uses the samples from either component. The preferred approach is to use both base band signal samples by taking the ratio of (57) and (56) as $$\frac{E\{n_{C_Q}\}}{E\{n_{C_I}\}} = \frac{e^{-\sigma_g^2/2}\sin\mu_g}{e^{-\sigma_g^2/2}\cos\mu_g} = \frac{\sin\mu_g}{\cos\mu_g}. \quad (59)$$

Since $\mu_g = \hat{\phi}_{t,C}$, an estimate of $\hat{\phi}_{t,C}$ is expressed as $$\hat{\phi}_{t,c} = \tan^{-1}\left(\frac{\hat{\mu}_{n_{C_Q}}}{\hat{\mu}_{n_{C_I}}}\right). \quad (60)$$

This same phase estimation method is then used for the other two stacks in the array. The final signal phase estimate $\hat{\phi}_t$ is then the average of these three estimates. Since the ASLA array is symmetrical about the y-axis, taking the average of the estimates will also compensate for the minor errors in the arrays reorientation, i.e., errors in the estimate $\hat{\theta}_t$. The estimated complex signal for the $n^{th}$ stack is then expressed as $$\hat{\Omega}_n = N_s \exp(j\hat{\phi}_t). \quad (61)$$

We then sum the estimates of all three stacks to obtain the final main beam response as $$\hat{\Omega}_t = \sum_{n=1}^{3} \hat{\Omega}_n \quad (62)$$

Example 8—Simulated Results

A series of Monte Carlo simulations to support proposed localization technique is presented in this section. The results of the simulation are based on 10,000 trials each. For each simulation, the ASLA configuration is arranged in accordance with FIG. 4A, with $r_a = 200$ m and $N_s = 5$. Note, since TDOA measurements are typically on the order of nanoseconds for convenience we use RDOA, i.e., the TDOA measurement weighted by the signal propagation speed c, which is typically on the order of meters. This substitution is used only as a means to simplify the simulation results and does not affect the theory in any way.

For localization schemes, a widely used performance metric is the CRLB (see References 10 and 21). The CRLB is the theoretical minimum solution variance an estimator can achieve. Any unbiased estimator that can achieve the CRLB is said to be efficient (see Reference 18). For our proposed network, the CRLB for location (minimum location uncertainty) and bearing are expressed as $$\omega_{CRLB} = \left[\frac{Mr_a^4}{8\sigma_R^2 c^2 r_t^4}\sin^4\theta_t\right]^{-1} \quad (63)$$

and $$\theta_{CRLB} = \left[\frac{2Mr_a^2}{\sigma_R^2 c^2}\sin^2\theta_t\right]^{-1}, \quad (64)$$

where M is the number of sensor, $r_a$ is the distance between the outer and center node stacks, $\sigma_R^2$ is the ranging measurement error variance, and $\theta_t$ is the target source bearing.

For estimation processes, the root mean-square error (RMSE) is a standard performance metric. For source localization, we focus on two RMSE values, the first being RMSE of location estimates defined as $$\xi_{loc} = \sqrt{\frac{\sum_{i=1}^{n_t}\|\hat{\omega}_t - \omega_t\|^2}{n_t}}, \quad (65)$$

where $\omega_t$ is a 2×1 vector containing the true source's location, $\hat{\omega}_t$ is the estimate $\omega_t$, and $n_t$ is the number of trials. The second value is the RMSE of bearing estimates defined as $$\xi_\theta = \sqrt{\frac{\sum_{i=1}^{n_t}(\hat{\theta}_t - \theta_t)^2}{n_t}}, \quad (66)$$

where $\theta_t$ is the true source bearing and $\hat{\theta}_t$ is its estimate.

For signal estimation, we focus on the RMSE of magnitude and phase. The RMSE of magnitude estimates is defined as $$\xi_V = \sqrt{\frac{\sum_{i=1}^{n_t}(\hat{V}_t - V_t)^2}{n_t}}, \quad (67)$$

where $V_t$ is the true signal magnitude and $\hat{V}_t$ is its estimate. The RMSE of phase estimates is defined as $$\xi_\phi = \sqrt{\frac{\sum_{i=1}^{n_t}(\hat{\phi}_t - \phi_t)^2}{n_t}}, \quad (68)$$

where $\phi_t$ is the true signal magnitude and $\hat{\phi}_t$ is its estimate.

Example 9—Signal Localization Performance

Figure 10:
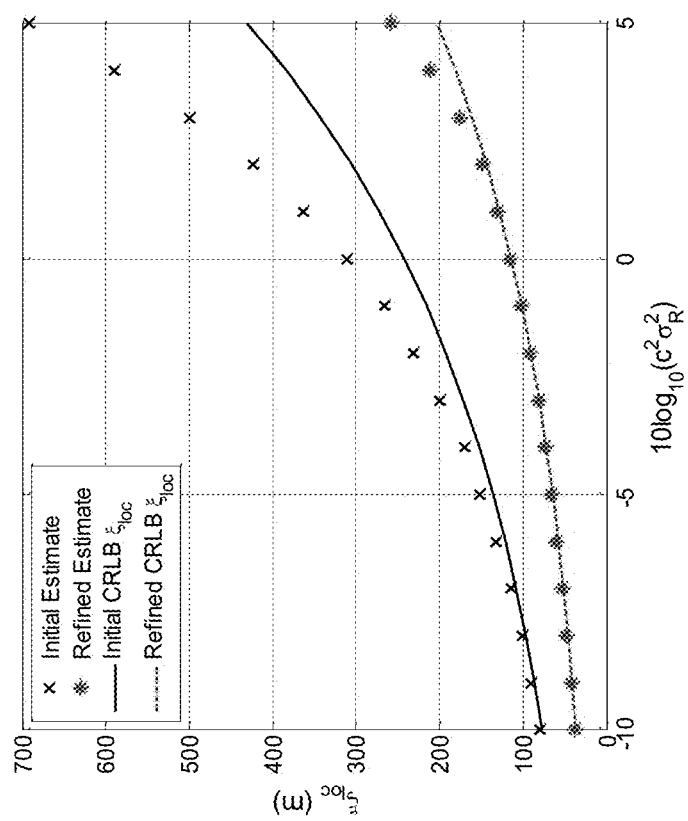
FIG. 10 shows a plot of the root mean square error of initial and refined localizations versus RDOA noise.

In FIG. 10, the RMSE of location estimate $\xi_{loc}$ for both the initial and refined localization are compared against their corresponding CRLB as a function of RDOA noise variance $c^2\sigma_R^2$. In this simulation, $N_s = 5$, the emitter is located at $\omega_t = [2500 \text{ in}, 45 \text{ deg}]^T$, $r_a = 200$ m, and each data point is the result of 10,000 trials. From the results, we see that the $\xi_{loc}$ of both the initial and refined estimates increase rapidly with noise. As expected, the $\xi_{loc}$ of the refined estimate outperforms the initial estimate at all values of noise simulated. Also, we can see that the refined estimator using a ML estimate approaches the CRLB up to approximately 0 dB. It is important to note that the ML estimate is asymptotically efficient [22], but here, using the ASLA formation, it approaches the CRLB in one iteration.

Figure 11:
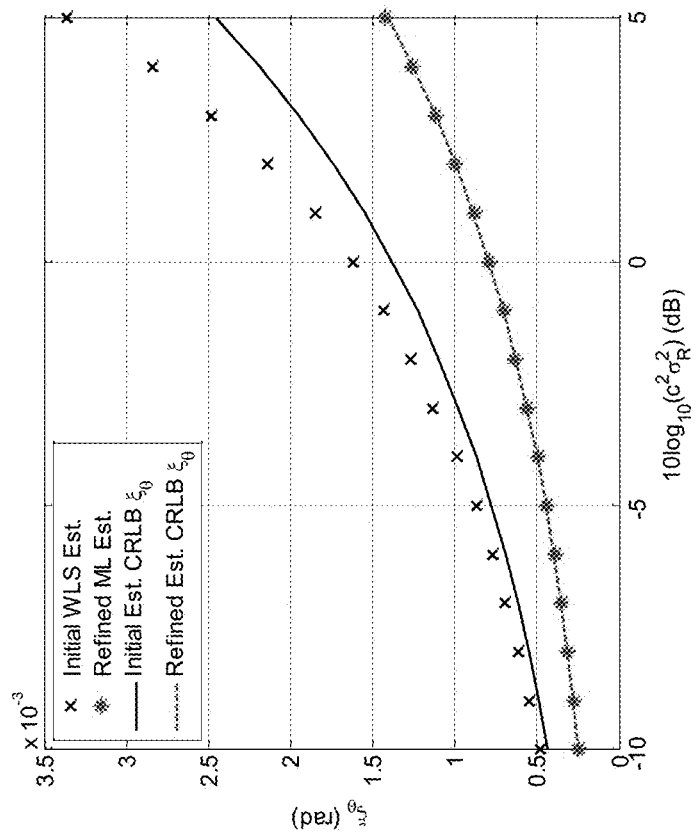
FIG. 11 shows a plot of the initial and refined localizations versus RDOA noise.

Similar to the previous simulation, a plot of the angular RMSE $\xi_\theta$ for both the initial and refined localization as a function of $c^2\sigma_R^2$ is provided in FIG. 11. From the results, we observe that the same trends as in FIG. 10. From [10], we know that the ASLA formation yields an accurate bearing estimate. This is validated by the simulation results with the refined estimator's $\xi_\theta$=−0.25×10$^{-3}$ rad at −10 dB RDOA noise. The initial bearing estimate is just shy of the CRLB, while the refined ML estimate approaches it at all simulated values. As with the $\xi_{loc}$ estimate, the ML estimator also approaches the CRLB in one iteration.

Example 10—Signal Collection Performance

To evaluate the proposed scheme's performance in the presence of Gaussian sensor position errors, we conducted a series of Monte Carlo simulations. The results of these simulations focus on the RMSE for signal magnitude ($\xi_\nu$) and phase ($\xi_\phi$) estimate. For comparison, the no-estimation case, i.e., beamforming without signal estimation, is also shown. For each of these simulations, $\lambda$=1 m, the source emitter is located at $\omega_t$=[2000 m, 15 deg]$^T$, $r_a$=200 meters, and $N_s$=10. All data points are the result of 10,000 trials.

Figure 12:
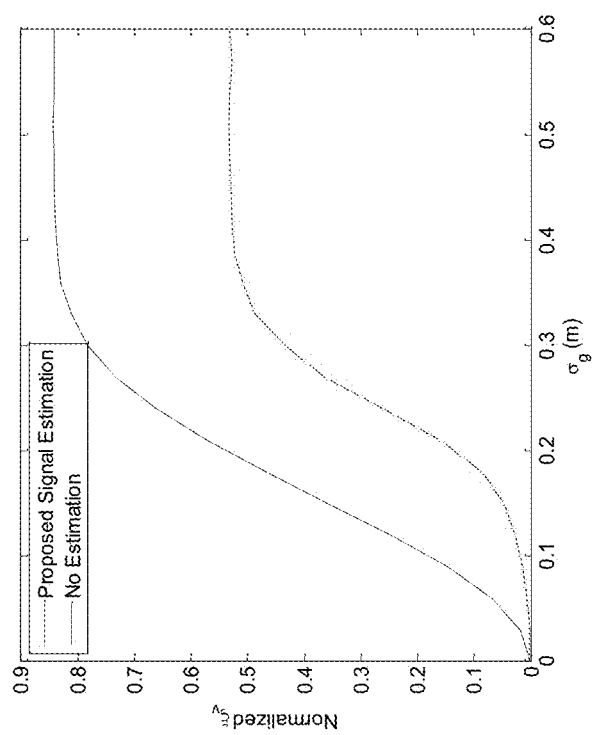
FIG. 12 shows a plot of the root mean square error of normalized magnitude versus the standard deviation of the Gaussian position error.

A comparison of the scheme's RMSE of normalized magnitude $\xi_\nu$ with and without signal estimation as a function of the standard deviation of Gaussian position error $\sigma_g$ is shown in FIG. 12. In this simulation, to isolate the effect position error, the target signal's $\theta_t$ is known a priori. From the results, we can see that the estimated case outperforms the no-estimation case at all values of $\sigma_g$ simulated. This suggests that signal estimation provides an effective means of reducing the effects of Gaussian position errors.

Figure 13:
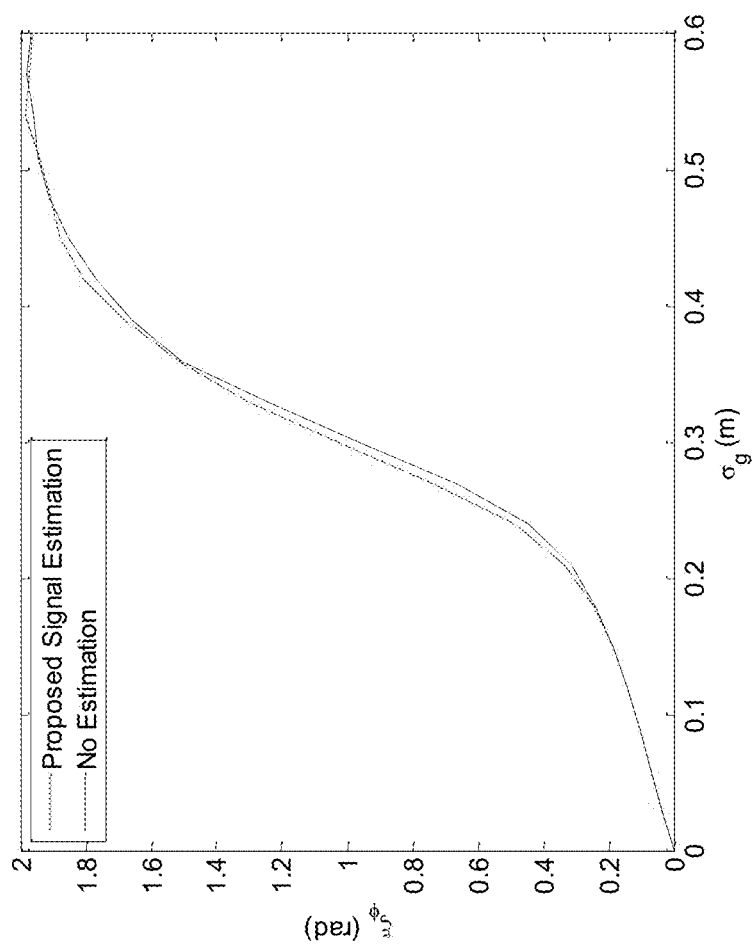
FIG. 13 shows a plot of the root mean square error of phase versus the standard deviation of the Gaussian position error.

The scheme's $\xi_\phi$ as a function of Gaussian position error $\sigma_g$ is shown in FIG. 13. Similar to the previous simulation, we assumed the target signal's $\theta_t$ is known a priori. From the results, we observe no noticeable difference in the $\xi_\phi$ between the proposed signal estimation case and the no-estimation case. This suggests that the proposed signal estimation technique does not improve the accuracy of the main beam signal phase, but as seen in FIG. 12 does improve its magnitude gain.

Figure 14:
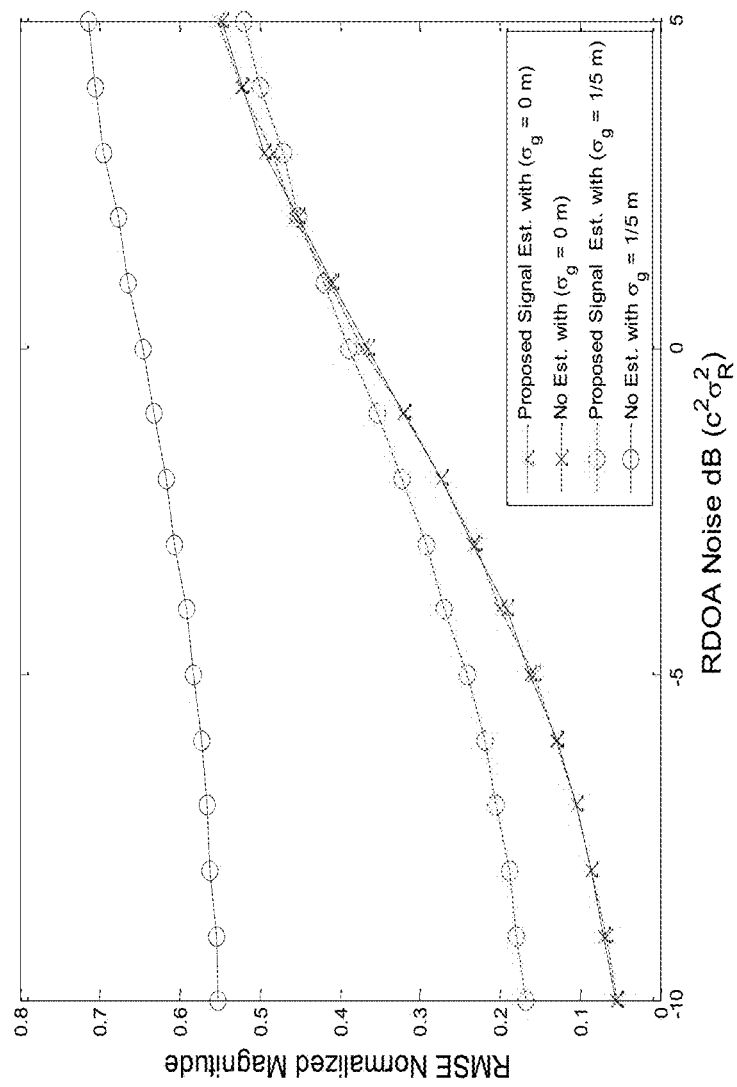
FIG. 14 shows a plot of the root mean square error of normalized magnitude versus RDOA noise.

The scheme's $\xi_\nu$ as a function of RDOA noise variance $c^2\sigma_R^2$ is shown in FIG. 14. In this simulation, the scheme is evaluated at two levels of position error with $\sigma_g$=0 and $\sigma_g$=⅕ m. From the results, we can see that the proposed scheme and no-estimation case have the same performance when no position errors are present. When position errors are introduced, we see that the proposed scheme outperform the no-estimation case. Of interest, we see that the scheme also outperforms the same case with no position error for values of RDOA noise greater than 2 dB. This would suggest that at a given $c^2\sigma_R^2$ level, position errors become less of a factor than errors in $\theta_t$.

Figure 15:
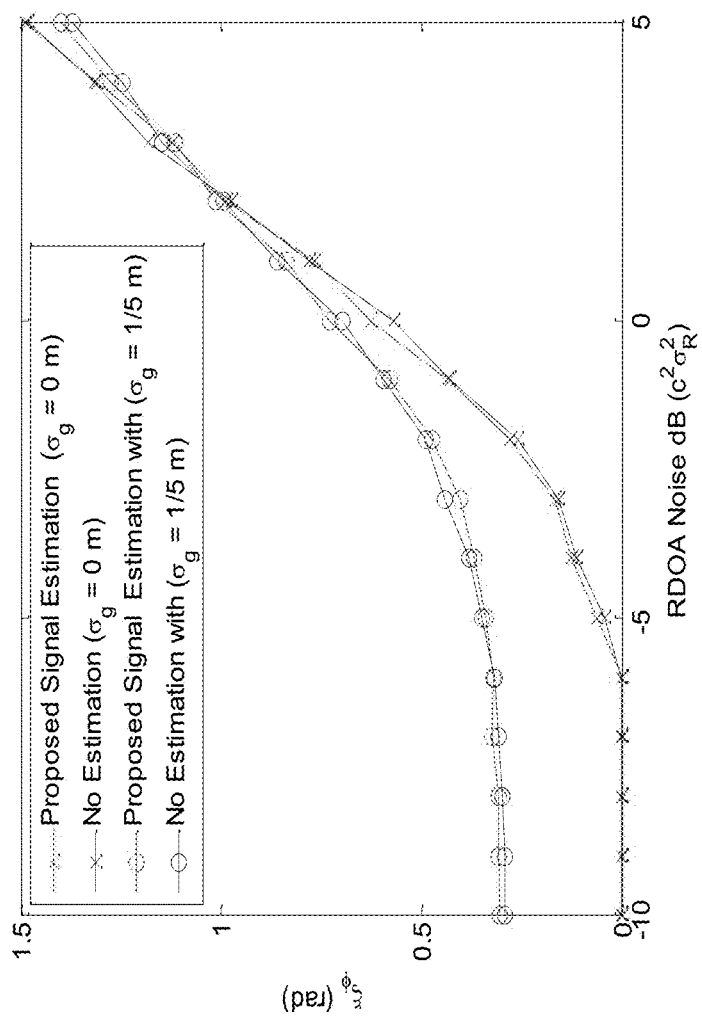
FIG. 15 shows a plot of the root mean square error of phase versus RDOA noise.

A comparison of the scheme's $\xi_\phi$ as a function of $c^2\sigma_R^2$ is shown in FIG. 15. Similar to the previous simulation, the performance was evaluated at two levels of position error, $\sigma_g$=0 and $\sigma_g$=⅕ m. Similar to FIG. 13, we can see that the proposed scheme and no-estimation case have the same performance with or without position errors. Also, similar to the previous simulation, we see that the cases with position error beat the no position error cases at values of RDOA noise greater than 2 dB.

Performing collaborative beamforming from an elevated, mobile WSN requires a coordinated interplay of many different signal processes and technologies. The objective of this research was to maximize signal collection performance in the presence of various signal and sensor related errors from an elevated, mobile WSN. To accomplish this objective, we proposed a signal collection scheme that exploits an elevated, mobile network to maximize the collaborative collection of a target signal.

In the localization technique, we proposed the use of two sequential location estimators. This technique consists of an initial WLS estimate followed by a ML estimate. Simulation results showed the proposed localization technique to be efficient, i.e., the variance of the estimation error approaches the CRLB. For the signal collection technique, we analyzed the effects of Gaussian position errors on the main beam response. We validated our results and showed that the mean value of the main beam signal phase was unaffected by position errors. With this knowledge we derived a signal collection scheme that is effective in the presences of such errors. Simulation results yielded an array gain improvement over standard beamforming of approximately 37 percent for the standard deviation of position error values greater than 0.4 m.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to a system for performing the operations discussed herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of determining a location of a remote transmitter, the method comprising:
    receiving, with a plurality of sensors operably associated with a plurality of unmanned aerial vehicles (UAVs), a signal emitted from a remote transmitter, the emitted signal being indicative of an actual location of the remote transmitter;
    estimating a first location of the remote transmitter based on the emitted signal received by the plurality of sensors, the plurality of sensors being associated with a first arrangement of the corresponding plurality of UAVs relative to the remote transmitter;
    changing the first arrangement of the plurality of UAVs relative to the remote transmitter to a target arrangement of the plurality of UAVs relative to the remote transmitter based on the estimation of the first location of the remote transmitter; and
    estimating a second location of the remote transmitter based on the target arrangement of the plurality of sensors and the corresponding plurality of UAVs relative to the remote transmitter;
    wherein the second estimated location is more accurate of the actual location of the remote transmitter than the first estimated location.

2. The method of claim 1, further comprising:
    prior to estimating a first location of the remote transmitter based on the emitted signal received by the plurality of sensors, applying a weighted least-squares estimation to the received signal to detect errors included therein.

3. The method of claim 2, wherein applying a weighted least-squares estimation to the received signal to detect errors included therein further comprises:
    generating at least one time difference of arrival measurement from the received signal; and
    applying the weighted least-squares estimation to the received signal using the at least one time different of arrival measurement.

4. The method of claim 1, wherein estimating a first location of the remote transmitter based on the emitted signal received by the plurality of sensors further comprises:
    applying a maximum-likelihood estimation to the received signal to determine the first location of the remote transmitter.

5. The method of claim 1, wherein changing the first arrangement of the plurality of UAVs relative to the remote transmitter to a target arrangement of the plurality of UAVs relative to the remote transmitter based on the estimation of the first location of the remote transmitter further comprises:
    obtaining a location estimate associated with the emitted signal;
    calculating an angle of an emitter bearing estimate based on the location estimate; and
    changing the first arrangement of the plurality of UAVs relative to the remote transmitter to the target arrangement of the plurality of UAVs relative to the remote transmitter based on the angle of the emitter bearing estimate.

6. The method of claim 5, wherein, in the target arrangement, at least one UAV of the plurality of UAVs is configured to be fixed relative to the remote transmitter, and the remaining UAVs are configured to be in a curved arrangement relative to the fixed UAV.

7. The method of claim 1, wherein calculating a second location of the transmitter based on the arrangement of the at least one sensor relative to the remote transmitter further comprises:
    amplifying the received signal using at least one of:
        a collaborative beamforming process; and
        a signal estimation process.

8. The method of claim 1, wherein at least one of the plurality of UAVs includes three groups of UAVs arranged along a longitudinal axis, one of the UAVs comprising a sink node, the other two UAVs being arranged on opposing sides of the sink node; and
    each UAV including at least one sensor.

9. A system for determining a location of a remote transmitter, the system comprising:
 a plurality of unmanned aerial vehicles (UAVs); and
 a plurality of sensors operably associated the UAVs, each of the sensors being configured to receive an emitted signal from an associated remote transmitter, the emitted signal being indicative of an actual location of the associated remote transmitter, each of the sensors includes at least one processor programmed to:
  estimate a first location of the associated remote transmitter based on the received signal;
 calculate an angle of an emitter bearing estimate based on the first location estimate;
  change an arrangement of the plurality of UAVs relative to the associated remote transmitter based on the angle of the emitter bearing estimate;
  calculate a second location of the associated remote transmitter based on the arrangement of the UAVs relative to the associated remote transmitter;
 wherein the second location being more accurate of the actual location of the associated remote transmitter than the first location.

10. The system of claim 9, wherein the at least one processor is further programmed to prior to estimating a first location of the associated remote transmitter based on the received signal from the remote transmitter, apply a weighted least-squares estimation to the received signal to detect errors included therein.

11. The system of claim 10, wherein the at least one processor is further programmed to generate at least one time difference of arrival measurement from the received signal; and
 apply the weighted least-squares estimation to the received signal using the at least one time different of arrival measurement.

12. The system of claim 9, wherein the at least one processor is further programmed to apply a maximum-likelihood estimation to the received signal to determine the first location of the associated remote transmitter.

13. The system of claim 9, wherein the plurality of UAVs are arranged to be substantially perpendicular to the associated remote transmitter based on the angle of the emitter bearing estimate.

14. The system of claim 9, wherein the at least one processor is further programmed to amplify the received signal using at least one of:
 a collaborative beamforming process; and
 a signal estimation process.

15. The system of claim 9, wherein at least one of the plurality of UAVs includes three groups of UAVs arranged along a longitudinal axis, one of the UAVs comprising a sink node, the other two UAVs being arranged on opposing sides of the sink node; and
 each UAV including at least one sensor.

16. A system for determining a location of a remote transmitter, the system comprising:
 a remote transmitter configured to emit a signal indicative of an actual location thereof;
 three groups of unmanned aerial vehicles (UAVs) arranged relative to the remote transmitter;
 a plurality of sensors operably associated with each UAV, each of the sensors including at least one processor programmed to:
  receive the emitted signal from the remote transmitter;
  estimate a first location of the remote transmitter based on the received signal by:
   obtaining a location estimate associated with the emitted signal; and
   calculate an angle of an emitter bearing estimate based on the location estimate;
  change an arrangement of the UAVs relative to the remote transmitter based on the angle of the emitter bearing estimate such that the UAVs are arranged to be substantially perpendicular to the remote transmitter; and
  calculate a second location of the remote transmitter based on the arrangement of the UAVs relative to the remote transmitter;
 wherein the second location is more accurate of the actual location of the remote transmitter than the first location.

17. The system of claim 16, wherein the at least one processor is further programmed to, prior to estimating a first location of the remote transmitter based on the received signal from the remote transmitter, generate at least one time difference of arrival measurement from the received signal; and
 apply the weighted least-squares estimation to the received signal using the at least one time different of arrival measurement.

18. The system of claim 16, wherein the at least one processor is further programmed to apply a maximum-likelihood estimation to the received signal to determine the first location of the remote transmitter.

19. The system of claim 16, wherein the at least one processor is further programmed to amplify the received signal using at least one of:
 a collaborative beamforming process; and
 a signal estimation process.

* * * * *